United States Patent
Takemoto et al.

(10) Patent No.: US 10,935,447 B2
(45) Date of Patent: Mar. 2, 2021

(54) IMPACT SENSING LAMINATE, IMPACT SENSING METHOD AND PROTECTION OBJECT INSPECTING METHOD

(71) Applicant: MITSUBISHI HEAVY INDUSTRIES, LTD., Tokyo (JP)

(72) Inventors: Hiroshi Takemoto, Tokyo (JP); Yoshiharu Kuze, Tokyo (JP); Mitsuyoshi Uematsu, Tokyo (JP); Seiji Kobayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 7 days.

(21) Appl. No.: 16/090,601

(22) PCT Filed: Apr. 21, 2017

(86) PCT No.: PCT/JP2017/015985
§ 371 (c)(1),
(2) Date: Oct. 2, 2018

(87) PCT Pub. No.: WO2017/195566
PCT Pub. Date: Nov. 16, 2017

(65) Prior Publication Data
US 2019/0113406 A1    Apr. 18, 2019

(30) Foreign Application Priority Data

May 12, 2016    (JP) .............................. JP2016-095934

(51) Int. Cl.
*G01L 5/00*    (2006.01)
*G01L 1/16*    (2006.01)
(Continued)

(52) U.S. Cl.
CPC .............. *G01L 5/0052* (2013.01); *B32B 7/12* (2013.01); *B32B 27/08* (2013.01); *B32B 27/36* (2013.01);
(Continued)

(58) Field of Classification Search
CPC ......... G01L 5/0052; G01L 1/06; G01L 1/247; G01L 1/16; G01P 15/00; B32B 7/12;
(Continued)

(56) References Cited

U.S. PATENT DOCUMENTS 3,722,355 A * 3/1973 King .......................... F41H 1/02
                                                              89/36.02
4,923,728 A * 5/1990 Snedeker .................. B32B 3/18
                                                              428/52
(Continued)

FOREIGN PATENT DOCUMENTS

DE    102008003498 A1    7/2009
JP          3664622 B2    6/2005
(Continued)

OTHER PUBLICATIONS

Partial Supplementary European Search Report for European Application No. 17795927.7 dated Mar. 19, 2019; 12pp.
(Continued)

*Primary Examiner* — Lisa M Caputo
*Assistant Examiner* — Alex T Devito
(74) *Attorney, Agent, or Firm* — Kanesaka Berner and Partners, LLP

(57) ABSTRACT

An impact sensing laminate 2 has a first surface 211 on which an impact force acts; a second surface 222 brought in contact with a protection object OBJ; an impact absorption layer 21 and a first pressure-sensitive layer 22. When a direction heading for the second surface from the first surface is defined as a first direction, the first pressure-
(Continued)

sensitive layer is in the first direction from the impact absorption layer. The first pressure-sensitive layer is a layer of sensing a first impact force as the impact force to have been attenuated by the impact absorption layer.

10 Claims, 16 Drawing Sheets

(51) Int. Cl.
| | |
|---|---|
| *B64F 5/60* | (2017.01) |
| *G01P 15/00* | (2006.01) |
| *B32B 7/12* | (2006.01) |
| *B32B 27/08* | (2006.01) |
| *B32B 27/36* | (2006.01) |
| *B32B 27/40* | (2006.01) |
| *B64C 3/26* | (2006.01) |
| *G01L 1/06* | (2006.01) |
| *G01L 1/24* | (2006.01) |

(52) U.S. Cl.
CPC ............... *B32B 27/40* (2013.01); *B64C 3/26* (2013.01); *B64F 5/60* (2017.01); *G01L 1/06* (2013.01); *G01L 1/16* (2013.01); *G01L 1/247* (2013.01); *G01P 15/00* (2013.01); *B32B 2307/558* (2013.01); *B32B 2605/18* (2013.01)

(58) Field of Classification Search
CPC ......... B32B 27/08; B32B 27/36; B32B 27/40; B32B 2307/558; B32B 2605/18; B64C 3/26; B64F 5/60
See application file for complete search history.

(56) References Cited

U.S. PATENT DOCUMENTS

| | | | | |
|---|---|---|---|---|
| 5,976,656 | A | * | 11/1999 | Giraud ..................... B32B 7/04 428/44 |
| 5,996,115 | A | * | 12/1999 | Mazelsky ................. F41H 1/02 2/2.5 |
| 6,349,201 | B1 | * | 2/2002 | Ford ......................... F41H 1/02 2/455 |
| 6,373,373 | B1 | | 4/2002 | Saito |
| 7,647,809 | B1 | | 1/2010 | Cooney |
| 8,691,383 | B2 | | 4/2014 | Georgeson et al. |
| 2004/0211862 | A1 | * | 10/2004 | Elam ...................... A63H 27/02 244/58 |
| 2005/0200139 | A1 | | 9/2005 | Suzuki |
| 2011/0219852 | A1 | | 9/2011 | Kasten |
| 2011/0251802 | A1 | | 10/2011 | Song |
| 2016/0025531 | A1 | | 1/2016 | Bischoff et al. |
| 2016/0178463 | A1 | | 6/2016 | Georgeson et al. |

FOREIGN PATENT DOCUMENTS

| | | |
|---|---|---|
| JP | 2008010078 A | 1/2008 |
| JP | 4585489 B2 | 11/2010 |
| JP | 2016136127 A | 7/2016 |

OTHER PUBLICATIONS

International Preliminary Report on Patentability for International Application No. PCT/JP2017/015985 dated Nov. 22, 2018; 6pp.
Extended European Search Report for European Application No. 17795927.7 dated Aug. 16, 2019; 12pp.
Office Action for Japanese Application No. 2016-095934 dated Jun. 13, 2018; 4pp.
Decision to Grant a Patent for Japanese Application No. 2016-095934 dated Aug. 22, 2018; 4pp.

\* cited by examiner

IMPACT SENSING LAMINATE, IMPACT SENSING METHOD AND PROTECTION OBJECT INSPECTING METHOD

RELATED APPLICATIONS

The present application is a National Phase of International Application Number PCT/JP2017/015985 filed Apr. 21, 2017 and claims priority based on Japanese Application Number 2016-095934 May 12, 2016.

TECHNICAL FIELD

The present invention relates to an impact sensing laminate, an impact sensing method and a protection object inspecting method.

BACKGROUND ART

For example, in a process of manufacturing a main wing of an aircraft, various inspections such as a non-destructive inspection are carried out to the main wing after assembly.

For example, in the process of manufacturing the main wing of the aircraft, a human error can occur. Therefore, damage may occur in a part that has passed an inspection once due to the human error (ex. sudden fall of a tool by a worker). To secure a high safety in the field of aircraft, an inspection is carried out once again before delivery of the completed aircraft (in this case, called an inspection before delivery). The inspection of whether or not there is a location on which the impact force exceeding a threshold value acted is contained in the inspection before delivery.

As the technique relating to the sensing of an impact force, Patent Literature 1 (JP 2008-10078A) discloses an impact sensing structure that senses an impact force which information equipment received. According to Patent Literature 1, a couple of supporting members are provided inside the housing of information equipment. Each of the supporting members has elasticity and has a concave section. An internal part is installed in the concave sections of the couple. Moreover, an impact trace maintenance member is provided to plastic deform by the impact. A part of the impact trace maintenance member contacts the housing and the inner part, respectively.

CITATION LIST

[Patent Literature 1] JP 2008-10078A

SUMMARY OF THE INVENTION

If the number of times of the inspection increases, the work increases. Therefore, the efficiency of the inspection is easy to fall. In a manufacturing process or a maintenance process in which an inspection such as a non-destructive inspection is carried out (ex. aircraft, car, ship, and rocket), the inventors of the present invention was looking for a technique of improving efficiency of the inspection while maintaining the precision of the inspection.

One of the objects of the present invention is to improve the efficiency of inspection while maintaining the precision of inspection. Other objects would become clear from the present application.

An impact sensing laminate in some embodiments has a first surface on which an impact force acts; a second surface brought in contact with a protection object; an impact absorption layer; and a first pressure-sensitive layer.

When a direction heading for the second surface from the first surface is defined as a first direction, the first pressure-sensitive layer is provided in the first direction from the impact absorption layer. The first pressure-sensitive layer is a layer of sensing a first impact force as an impact force to have been attenuated by the impact absorption layer.

The impact sensing laminate may further include a second pressure-sensitive layer.

The impact absorption layer is arranged between the first pressure-sensitive layer and the second pressure-sensitive layer. The second pressure-sensitive layer is a layer of sensing a second impact force as an impact force before being attenuated by the impact absorption layer.

The first pressure-sensitive layer may be a layer of sensing whether or not a magnitude of the first impact force per unit area exceeds a first threshold value. The second pressure-sensitive layer may be a layer of sensing whether or not a magnitude of the second impact force per unit area exceeds a second threshold value. The first threshold value may be different from the second threshold value.

The first pressure-sensitive layer may be different from the second pressure-sensitive layer in a thickness or a material.

When a permissible impact force per unit area is defined as a permissible impact force, the impact absorption layer attenuates an impact force of 1.5 times of the permissible impact force to the permissible impact force or below, to transmit to the first pressure-sensitive layer.

The first pressure-sensitive layer may be anyone of a layer that contains a color former, a layer that contains shape memory alloy, and a layer that contains a plurality of piezo-electric devices arranged 2-dimensionally.

At least one of the first pressure-sensitive layer and the impact absorption layer may be divided into a plurality of blocks, and may have cut lines or weakened lines surrounding each of the plurality of blocks.

The impact absorption layer may be delaminatable from the first pressure-sensitive layer.

The second surface may be a surface of an adhesion layer which is detachable to the protection object.

The impact absorption layer generates a color based on the impact force that acts on the impact absorption layer.

An impact sensing method in some embodiments includes: preparing an impact sensing laminate that contains an impact absorption layer and a first pressure-sensitive layer; arranging the impact sensing laminate on a protection object; and sensing the impact force which acts on the impact sensing laminate. The sensing the impact force includes the first pressure-sensitive layer senses the first impact force which is the impact force to have been attenuated by the impact absorption layer.

In the impact sensing method, the impact sensing laminate may further include a second pressure-sensitive layer. The impact absorption layer may be arranged between the first pressure-sensitive layer and the second pressure-sensitive layer.

The sensing the impact force may further include: sensing a second impact force as an impact force before being attenuated by the impact absorption layer; specifying a second impact force acting area as an area on which the second impact force acted; delaminating the second impact force acting area of the second pressure-sensitive layer from the impact sensing laminate to form a first delamination area; and specifying the first impact force acting area as an area on which the first impact force acted, from the first delamination area.

The sensing the impact force may further include delaminating the first impact force acting area of the first pressure-sensitive layer from the impact sensing laminate to form a second delamination area.

The impact sensing method may further include reusing to sense the impact force that acts on the impact sensing laminate in which the first delamination area and the second delamination area are formed.

A protection object inspecting method in some embodiments includes preparing an impact sensing laminate that contains an impact absorption layer and a first pressure-sensitive layer; arranging the impact sensing laminate on a protection object; and sensing an impact force that acts on the impact sensing laminate.

The sensing an impact force includes sensing a first impact force as the impact force to have been attenuated by the impact absorption layer by the first pressure-sensitive layer; specifying a first impact force acting area in which a magnitude of the first impact force per unit area exceeds a first threshold value; and inspecting an area of the protection object corresponding to the first impact force acting area.

In the protection object inspecting method, the protection object contains a main wing of an aircraft.

In a manufacturing process in which an inspection containing a non-destructive inspection is carried out, the efficiency of inspection is improved while maintaining the precision of inspection.

DESCRIPTION OF EMBODIMENTS

Figure 1A:
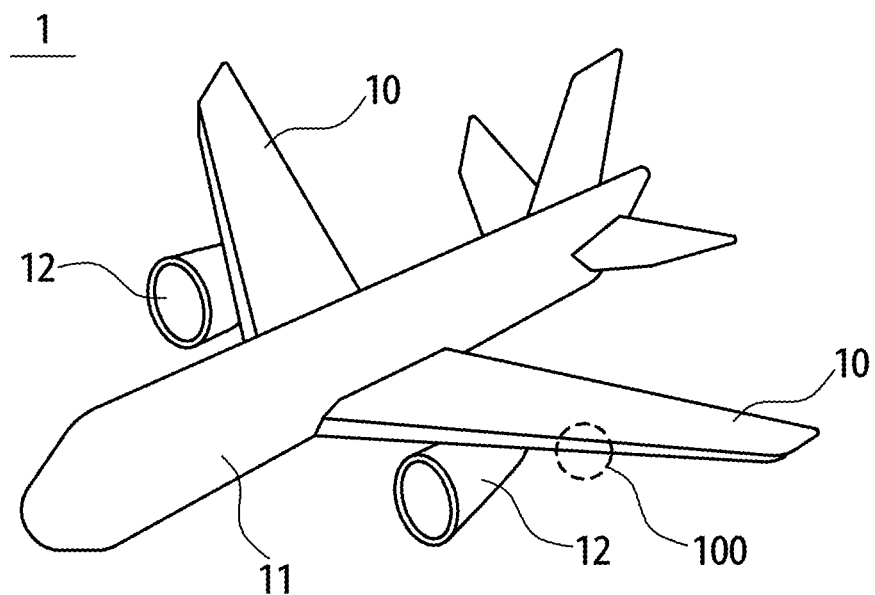
FIG. 1A is a schematic diagram of an aircraft 1.

Hereinafter, embodiments of the present invention will be described with reference to the attached drawings. In the following embodiments, an identical reference numeral is assigned to an identical member as far as there is no caution. The repetitive description of the identical member is omitted.

In the Specification of the present patent application, the field of an aircraft is given as an example. However, the following embodiments can be applied to other fields (ex. an automobile, a ship, a rocket, and large-sized electronic equipment). Also, in the Specification of the present application, a main wing of the aircraft is given as an example. However, the following embodiments can be applied to other parts (ex. a fuselage, a horizontal stabilizer, and a vertical stabilizer).

1. Matters Having been Recognized by Inventors of Present Invention

Figure 1B:
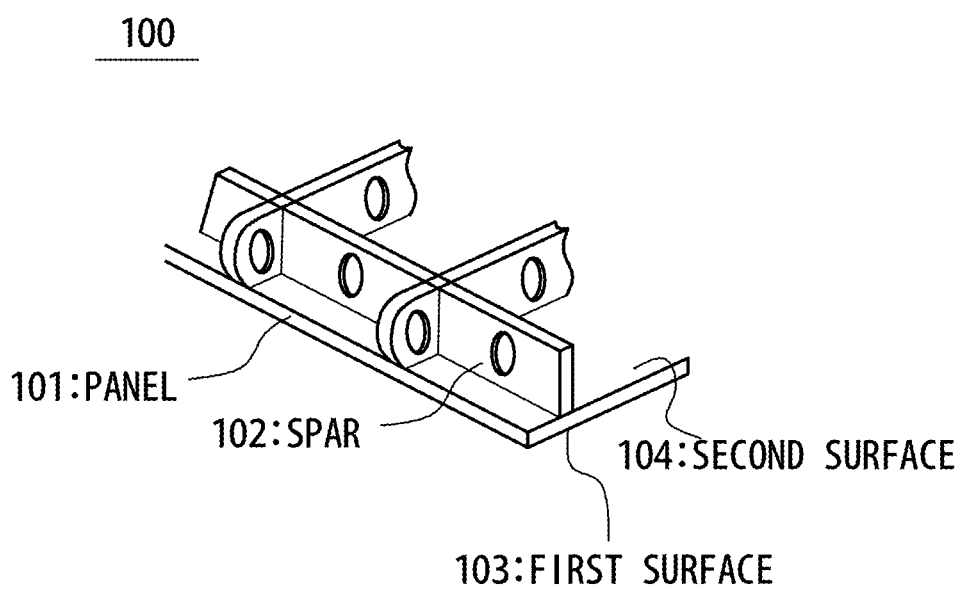
FIG. 1B is a partial perspective view schematically showing a part 100 of a main wing 10 shown in FIG. 1A.

FIG. 1A is a schematic diagram of an aircraft 1. In an example shown in FIG. 1A, the aircraft 1 has a main wing (a right main wing and a left main wing) 10, a fuselage 11 and two engines 12. FIG. 1B is a diagram schematically showing the internal structure of a part 100 of the main wing 10 shown in FIG. 1A. In the example shown in FIG. 1B, the internal structure of the main wing 10 has a panel 101 and a spar 102. The panel 101 has a first surface 103 as an outer surface of the main wing 10 and a second surface 104 as an inner surface of the main wing 10. For example, the material of panel 101 is a composite material such as fiber reinforced plastics.

Various inspections (ex. a non-destructive inspections such as an ultrasonic inspection) are carried out to the main wing 10 after assembly. As the result of various inspections, when damage (ex. dent, nick, scratch, crack, and so on) is found out in the part of the main wing 10, the damage is repaired.

For example, in the field of aircraft, an inspection before delivery is carried out. In the inspection before delivery, the existence or non-existence of damage is inspected that is caused with impact force exceeding a permissible range. Also, for example, the members such as the panel 101 and the spars 102 around an access hole are inspected emphatically. This is because the damage is easy to occur in the member around the access hole caused by a human error.

If the damage with the impact force (external force) exceeding the permissible range can be easily found visually, the found damage will be able to be repaired at once. However, it is difficult to find the damage with the impact force exceeding the permissible range. One of the reasons is in a material used for the main wing of the aircraft. In recent years, a composite material having a light-weight and a high strength is used for the main wing of the aircraft. When the composite material is used for the main wing, there is a case where a degree of damage confirmed visually does not coincide with a degree of actual damage. Therefore, it is difficult even to an experienced worker to visually confirm damage caused by the impact force exceeding the permissible range. Therefore, in the inspection before delivery, an inspection object such as a member around the access hole is all over inspected once again by, for example, a non-destructive inspection.

Here, the inventors of the present invention thought that the efficiency of inspection could be improved while maintaining the precision of inspection, if it is possible to know whether or not an impact force acted on a protection object such as the main wing.

2. First Embodiment

2.1. Overview of Configuration

Figure 2:
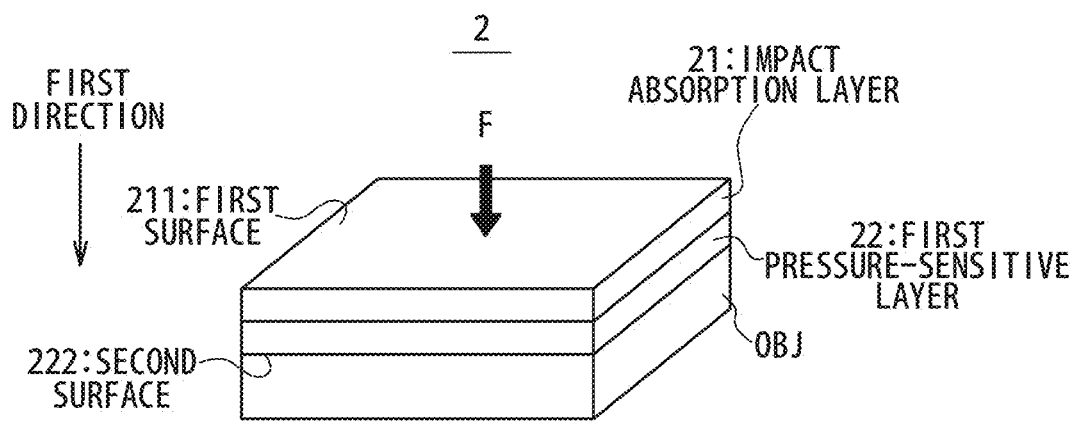
FIG. 2 is a schematic diagram showing an example of configuration of an impact sensing laminate 2.

FIG. 2 is a schematic diagram showing an example of configuration of an impact sensing laminate 2. In the example shown in FIG. 2, the impact sensing laminate 2 is provided for a part of a protection object OBJ where damage is easy to occur. The impact sensing laminate 2 has an impact absorption layer 21 and a first pressure-sensitive layer 22. Moreover, the impact sensing laminate 2 has a first surface 211 on which an external force F as the impact force acts, and a second surface 222 brought in contact with the protection object OBJ. In the example shown in FIG. 2, the first surface 211 is a surface of the impact absorption layer 21. The second surface 222 is a surface of the first pressure-sensitive layer 22. The direction heading for the second surface 222 from the first surface 211 is defined as a first direction. The first pressure-sensitive layer 22 is on the side of the first direction from the impact absorption layer 21. The first pressure-sensitive layer 22 is a layer sensing the impact force to have been attenuated by the impact absorption layer 21 (the first impact force). It is possible to know by the first pressure-sensitive layer 22 that the impact force acted on the protection object OBJ.

The first pressure-sensitive layer 22 senses an area of the first pressure-sensitive layer 22 on which the impact force acted, in addition to the magnitude of impact force to have been attenuated by the impact absorption layer 21. Therefore, the area of the protection object OBJ on which the impact force acted can be known.

Figure 3:
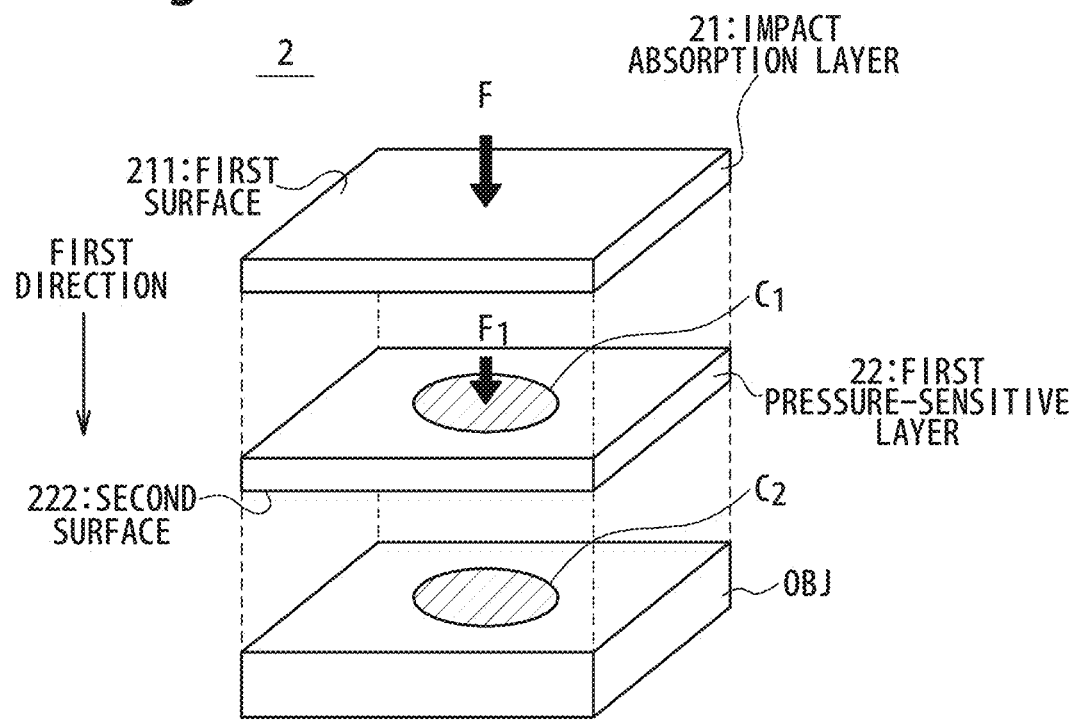
FIG. 3 is an exploded perspective view of the impact sensing laminate 2 shown in FIG. 2.

FIG. 3 is an exploded perspective view of the impact sensing laminate 2 shown in FIG. 2. The influence of the impact force F acting externally on the impact sensing laminate 2 will be described.

The influence of the impact force F is as follows.

1) The impact force F is attenuated by the impact absorption layer 21. In an example shown in FIG. 3, the impact force having been attenuated by the impact absorption layer 21 is shown as an impact force $F_1$. Although it is not necessary to say, the magnitude of impact force $F_1$ to have been attenuated by the impact absorption layer 21 is smaller than the magnitude of impact force F ($F_1 < F$).

2) The impact force $F_1$ to have been attenuated by the impact absorption layer 21 is transmitted to the first pressure-sensitive layer 22. An area $C_1$ shown by slanted lines in FIG. 3 shows an area ($C_1$) of the first pressure-sensitive layer 22 on which the impact force $F_1$ acted.

3) Moreover, the impact force $F_1$ is transmitted to the protection object OBJ from the first pressure-sensitive layer 22. An area $C_2$ shown by the slanted lines in FIG. 3 shows an area of the protection object OBJ on which the impact force $F_1$ acts.

As mentioned above, the second surface 222 of the impact sensing laminate 2 is in contact with the protection object OBJ. Therefore, if the area ($C_1$) of the first pressure-sensitive layer 22 on which the impact force $F_1$ to have been attenuated by the impact absorption layer 21 has acted can be specified, the impact force acted on the area $C_2$ of the protection object corresponding to an impact force acting area ($C_1$) can be known.

2.2. Overview of Impact Sensing Method

Referring to FIG. 3, the overview of the impact sensing method will be described. A worker first prepares the impact sensing laminates 2. Next, the worker arranges the impact sensing laminates 2 on the protection object OBJ. In such a situation, it is supposed that the impact force F acts on the first surface 211 of the impact sensing laminates 2. At this time, the first pressure-sensitive layer 22 senses the impact force $F_1$ to have been attenuated by the impact absorption layer 21. Therefore, the worker can know that the impact force acted on the protection object OBJ.

2.3. Overview of Protection Object Inspecting Method

The above-mentioned impact sensing method can be applied to inspection of the protection object. As described in the above-mentioned impact sensing method, the worker prepares the impact sensing laminates 2 and arranges the impact sensing laminates 2 on the protection object OBJ. After that, it is supposed that an impact force F acted on the impact sensing laminate 2. As mentioned above, the first pressure-sensitive layer 22 senses the impact force $F_1$ to have been attenuated by the impact absorption layer 21.

Next, the worker specifies an area of the first pressure-sensitive layer 22 on which the impact force $F_1$ to have been attenuated by the impact absorption layer 21 acted (impact force acting area $C_1$). Next, the worker inspects an area (area $C_2$) of the protection object corresponding to the impact force acting area $C_1$.

2.4. Main Effects

Firstly, it is possible to easily know whether or not the impact force acted on the protection object. Especially, in case of the main wing formed of the composite material, a high skill is required to the worker to determine whether or not the impact force acted on the protection object. Secondly, it is possible to specify the area of the protection object on which the impact force acted, in addition to the impact force acted on the protection object. Therefore, it is not necessary to inspect the whole of protection object OBJ but it is sufficient to emphatically inspect the area of the protection object on which the impact force acted. In other words, a work to inspect an area of the protection object on which the impact force did not act can be saved. This leads to improvement of the efficiency of inspection while maintaining the precision of inspection.

2.5. Configuration

Figure 4:
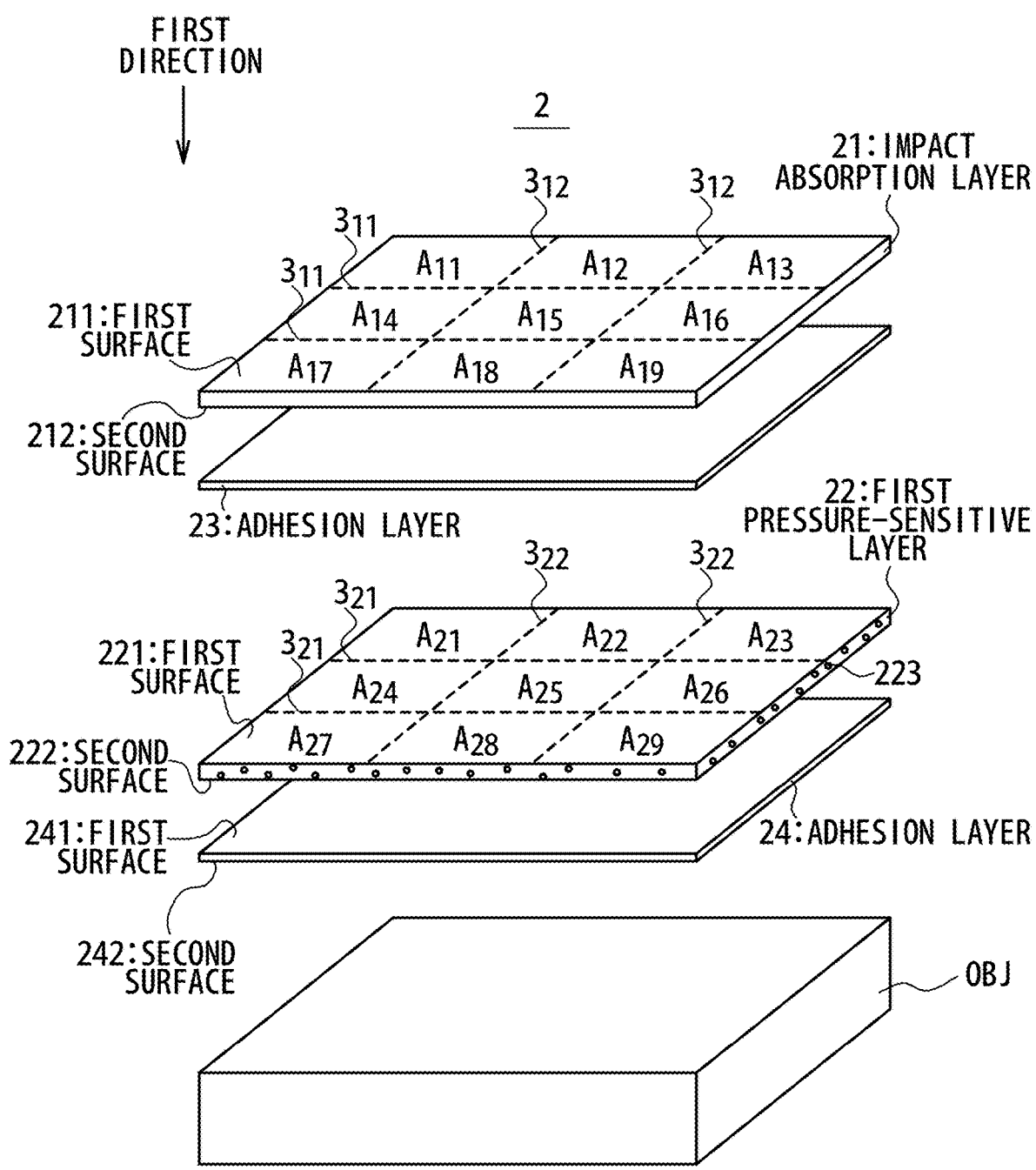
FIG. 4 is an exploded perspective view showing an example of configuration of the impact sensing laminate 2.

FIG. 4 is an exploded perspective view showing an example of configuration of the impact sensing laminate 2. In the example shown in FIG. 4, the impact sensing laminate 2 has the impact absorption layer 21, the first pressure-sensitive layer 22, the surface on which the impact force acts and the surface brought in contact with the protection object OBJ. Additionally, the impact sensing laminate 2 has an adhesion layer 23 and an adhesion layer 24. The surface on which the impact force acts is a first surface 211 of the impact absorption layer 21. The surface brought in contact with the protection object OBJ is a second surface 242 of the adhesion layer 24. Note that in the present Specification, the impact force contains a momentarily generated force as in case that a tool bumps against the impact sensing laminate 2.

(Impact Absorption Layer)

The impact absorption layer 21 has a role to protect the protection object OBJ. The impact absorption layer 21 is a layer to attenuate the impact force acting on itself. Specifically, the impact absorption layer 21 is arranged on the first pressure-sensitive layer 22 through the adhesion layer 23. The impact absorption layer 21 has the first surface 211 and a second surface 212 opposing to the first surface 211. For example, the impact absorption layer 21 is a layer of resin. For example, the impact absorption layer 21 is formed from a film of polyurethane or a film of polyethylene terephthalate (PET). The impact absorption layer 21 may be a laminate of a plurality of layers of same material (ex. polyurethane) or different materials (ex. a combination of the layers of resin and the layers of PET). The configuration of the impact absorption layer 21 is optional if the impact force acting on the impact absorption layer 21 is attenuated. It is desirable that the impact absorption layer 21 attenuates the impact force larger. It is desirable that the impact absorption layer 21 is a transparent layer such that the worker can visually check the first pressure-sensitive layer 22 through the impact absorption layer 21. The impact absorption layer 21 is a layer that can be delaminated from the first pressure-sensitive layer 22. For example, the impact absorption layer 21 may be a layer which can be delaminated from the first pressure-sensitive layer 22 by a hand without using any tool.

(First Pressure-Sensitive Layer)

The first pressure-sensitive layer 22 is arranged on the protection object OBJ through the adhesion layer 24. Specifically, the first pressure-sensitive layer 22 has a first surface 221 opposing to a second surface 222 in addition to the second surface 222. The first pressure-sensitive layer 22 is a layer that can be delaminated from the protection object OBJ. The first pressure-sensitive layer 22 may be a layer that can be delaminated from the protection object OBJ by a hand without using any tool. The first pressure-sensitive layer 22 has the following role. Firstly, the first pressure-sensitive layer 22 can sense the impact force to have been attenuated by the impact absorption layer 21. Secondly, an area on which the impact force acted can be sensed by the first pressure-sensitive layer 22. These two points are such as described above. However, the first pressure-sensitive layer 22 is a layer that does not sense the impact force of magnitude in a whole range but senses the impact force exceeding a specific magnitude. Specifically, the first pressure-sensitive layer 22 is a layer used to sense whether or not the impact force to have been attenuated by the impact absorption layer 21 (the impact force $F_1$ shown in FIG. 3) exceeds a first threshold value. However, the magnitude of impact force to have been attenuated is a magnitude per unit area. Also, the first pressure-sensitive layer 22 is used to sense an area of the first pressure-sensitive layer 22 on which the impact force exceeding the first threshold value acted (the impact force acting area $C_1$ shown in FIG. 3). One of the reasons why the first threshold value is given is in that damage caused by the impact force larger than a specific magnitude is emphatically inspected in the inspection before delivery, as described above.

The first pressure-sensitive layer 22 is, for example, a layer notifying by the change of a color of the first pressure-sensitive layer 22, that the impact force exceeding the first threshold value acted on the first pressure-sensitive layer 22. When the impact force exceeding the first threshold value acts on the first pressure-sensitive layer 22, the color of the area of the first pressure-sensitive layer 22 on which the impact force acted changes from an initial color to a specific color. In other words, the color of the impact force acting area changes. For example, the initial color is colorless. The colorlessness contains colorless transparency and semitransparency. For example, the specific color is red. In the first embodiment, according to the magnitude of impact force that acts on the first pressure-sensitive layer 22, the color density changes. For example, when the magnitude of impact force that acts on the first pressure-sensitive layer 22 becomes larger, the red color becomes darker. The color density of the first pressure-sensitive layer 22 may change step-by-step or may change continuously. The change of the color density of the first pressure-sensitive layer 22 is irreversible in principle. When the impact force smaller than the first threshold value acts on the first pressure-sensitive layer 22, the color change does not happen in the first pressure-sensitive layer 22. In other words, the color of the first pressure-sensitive layer 22 does not change. Note that the initial color and the specific color are optional.

For example, the first pressure-sensitive layer 22 is configured as follows. The first pressure-sensitive layer 22 is configured from a pressure-sensitive film (ex. a pressure sensitive paper) including a plurality of microcapsules 223 and developer (not shown). Each of the plurality of microcapsules 223 contains color former of red (an example). In the example shown in FIG. 4, the plurality of microcapsules 223 are provided in the first pressure-sensitive layer 22. However, the plurality of microcapsules 223 may be provided for the second surface 222. Each microcapsule 223 is broken when the impact force exceeding the first threshold value acts on the first pressure-sensitive layer 22. For example, the number of broken microcapsules 223 is proportional to the impact force that acted on the first pressure-sensitive layer 22. When the microcapsule 223 is broken, the color former in the broken microcapsule reacts with the developer in the periphery. As a result, in the periphery of the broken microcapsule, the color of the first pressure-sensitive layer 22 changes from the colorlessness to the red. The first pressure-sensitive layer 22 is sufficient to contain the color former.

(First Threshold Value)

For example, the first threshold value of the first pressure-sensitive layer 22 is set as follows. The first threshold value shows the magnitude of impact force per unit area. In the field of the aircraft, the permissible magnitude of impact force has been determined previously for every model of the aircraft and every part of the aircraft (ex. main wing, fuselage). In case of the main wing 10 shown in FIG. 1A, the permissible magnitude of impact force is, for example, 163 kg (·360 pounds) per unit area (2.54 cm·2.54 cm·1 inch·1 inch). In this example, the damage caused by the impact force exceeding 163 kg per unit area is dealt with to be repaired. Therefore, it is desirable that the first threshold value is 163 kg per unit area. Or, consider a safety, for example, a value smaller than 163 kg may be set as the first threshold value (ex. 140 kg per unit area). The first pressure-sensitive layer 22 having the first threshold value is obtained by adjusting the strength of each microcapsule 223 or the size of each microcapsule 223. Or, the thickness of the first pressure-sensitive layer 22 or the material of the first pressure-sensitive layer 22 (ex. a kind of the pressure-sensitive film) may be changed. To adjust the first threshold value minutely, the first surface 221 of the first pressure-sensitive layer 22 may be coated. By the coating, an erroneous sensing of the first pressure-sensitive layer 22 can be suppressed at the minimum.

(Adhesion Layer)

The adhesion layer 23 has a role to fix the impact absorption layer 21 on the first pressure-sensitive layer 22. The adhesion layer 23 may be a layer of pressure sensitive adhesive applied to the second surface 212 of the impact absorption layer 21 or may be a layer of pressure sensitive adhesive applied to the first surface 221 of the first pressure-sensitive layer 22. A thin air layer may be formed locally between the impact absorption layer 21 and the first pressure-sensitive layer 22. In other words, the adhesion layer may not be fully applied on the second surface 212 of the impact absorption layer 21 or on the first surface 221 of the first pressure-sensitive layer 22. Alternatively, the adhesion layer 23 may be a both-side tape. However, the adhesion layer 23 has an adhesive force by which the impact absorption layer 21 can be delaminated from the first pressure-sensitive layer 22. If the impact absorption layer 21 can be fixed on the first pressure-sensitive layer 22, the configuration of adhesion layer 23 is optional.

The adhesion layer 24 has a role to fix the first pressure-sensitive layer 22 on the protection object OBJ. In the example shown in FIG. 4, the adhesion layer 24 has a first surface 241 that comes in contact with the first pressure-sensitive layer 22, and a second surface 242 opposing to the first surface 241. The second surface 242 is a surface of an adhesion layer 23 attached to or delaminated from the protection object OBJ. The adhesion layer 24 may be a layer of pressure sensitive adhesive applied to the second surface 222 of the first pressure-sensitive layer 22 or may be a layer of the pressure sensitive adhesive applied to the protection object OBJ. A thin air layer may be formed locally between the first pressure-sensitive layer 22 and the protection object OBJ. In other words, the adhesive material may not be fully applied on the second surface 222 of the first pressure-sensitive layer 22 or on the protection object OBJ. Alternatively, the adhesion layer 24 may be a both-side tape. However, the adhesion layer 24 has an adhesive force by which the first pressure-sensitive layer 22 can be delaminated from the protection object OBJ. If the first pressure-sensitive layer 22 can be fixed on the protection object OBJ, the configuration of adhesion layer 24 is optional.

(Cut Line)

As shown in FIG. 4, each of the impact absorption layer 21 and the first pressure-sensitive layer 22 may have a plurality of cut lines $3_{11}$, $3_{12}$, $3_{21}$, and $3_{22}$. A plurality of cut lines are provided for each of the impact absorption layer 21 and the first pressure-sensitive layer 22. Thus, each of blocks of the impact sensing laminate 2 can be easily delaminated.

The details are as follows. The attention is paid on the impact absorption layer 21. In the example shown in FIG. 4, the impact absorption layer 21 is divided into nine blocks $A_{11}$ to $A_{19}$ and cut lines are provided to surround each of the nine blocks $A_{11}$ to $A_{19}$. The four cut lines contains two cut lines $3_{11}$ and two cut lines $3_{12}$ orthogonal to the two cut lines $3_{11}$. In the example shown in FIG. 4, each of the blocks $A_{11}$ to $A_{19}$ has a same area.

Attention is paid on the first pressure-sensitive layer 22. In the example shown in FIG. 4, the first pressure-sensitive layer 22 is divided into nine blocks $A_{21}$ to $A_{29}$, and cut lines $3_{21}$ and $3_{22}$ are provided to surround each of the nine blocks $A_{21}$ to $A_{29}$. The four cut lines contain the two cut lines $3_{21}$ and the two cut lines $3_{22}$ orthogonal to the two cut lines $3_{21}$. In the example shown in FIG. 4, each of the blocks $A_{21}$ to $A_{29}$ has a same area.

In the example shown in FIG. 4, the plurality of blocks $A_{11}$ to $A_{19}$ of the impact absorption layer 21 overlaps the plurality of blocks $A_{21}$ to $A_{29}$ of the first pressure-sensitive layer 22, respectively. In other words, the plurality of cut lines $3_{11}$, $3_{12}$ in the impact absorption layer 21 are arranged on the same positions as the plurality of cut lines $3_{21}$, $3_{22}$ in the first pressure-sensitive layer 22. Therefore, each of the blocks $A_{11}$ to $A_{19}$ in the impact absorption layer 21 has the same shape as the shape of a corresponding one of the blocks $A_{21}$ to $A_{29}$ in the first pressure-sensitive layer 22. Also, each of the blocks $A_{11}$ to $A_{19}$ in the impact absorption layer 21 has the same size as a corresponding one of the blocks $A_{21}$ to $A_{29}$ in the first pressure-sensitive layer 22.

Note that a weakened line may be used in place of the cut line. If the cut lines are provided on the same positions on the impact absorption layer 21 and the first pressure-sensitive layer 22, the number of blocks in the impact absorption layer 21 and the number of blocks in the first pressure-sensitive layer 22 are optional. The shape of each block of the impact absorption layer 21, and the shape of each block of the first pressure-sensitive layer 22 are optional (ex. hexagon). It is sufficient that at least one of the impact absorption layer 21 and the first pressure-sensitive layer 22 is divided into the plurality of blocks, and that the cut lines or the weakened lines are provided to surround each of the plurality of blocks.

(Protection Object)

The protection object OBJ may be the panel 101 of the main wing 10, or the spar 102 (reference to FIG. 1B). When the panel 101 is the protection object OBJ, the protection object OBJ may be a first surface 103 of the panel 101 or a second surface 104 of the panel 101. For example, when the protection object OBJ is the first surface 103 of the panel 101, the impact sensing laminates 2 are arranged on the whole first surface 103. In the example shown in FIG. 4, the surface of the protection object OBJ (the surface on which the impact sensing laminates are arranged) is a flat plane. However, the surface of the protection object OBJ may be a curved surface.

(Delamination Area)

Figure 5:
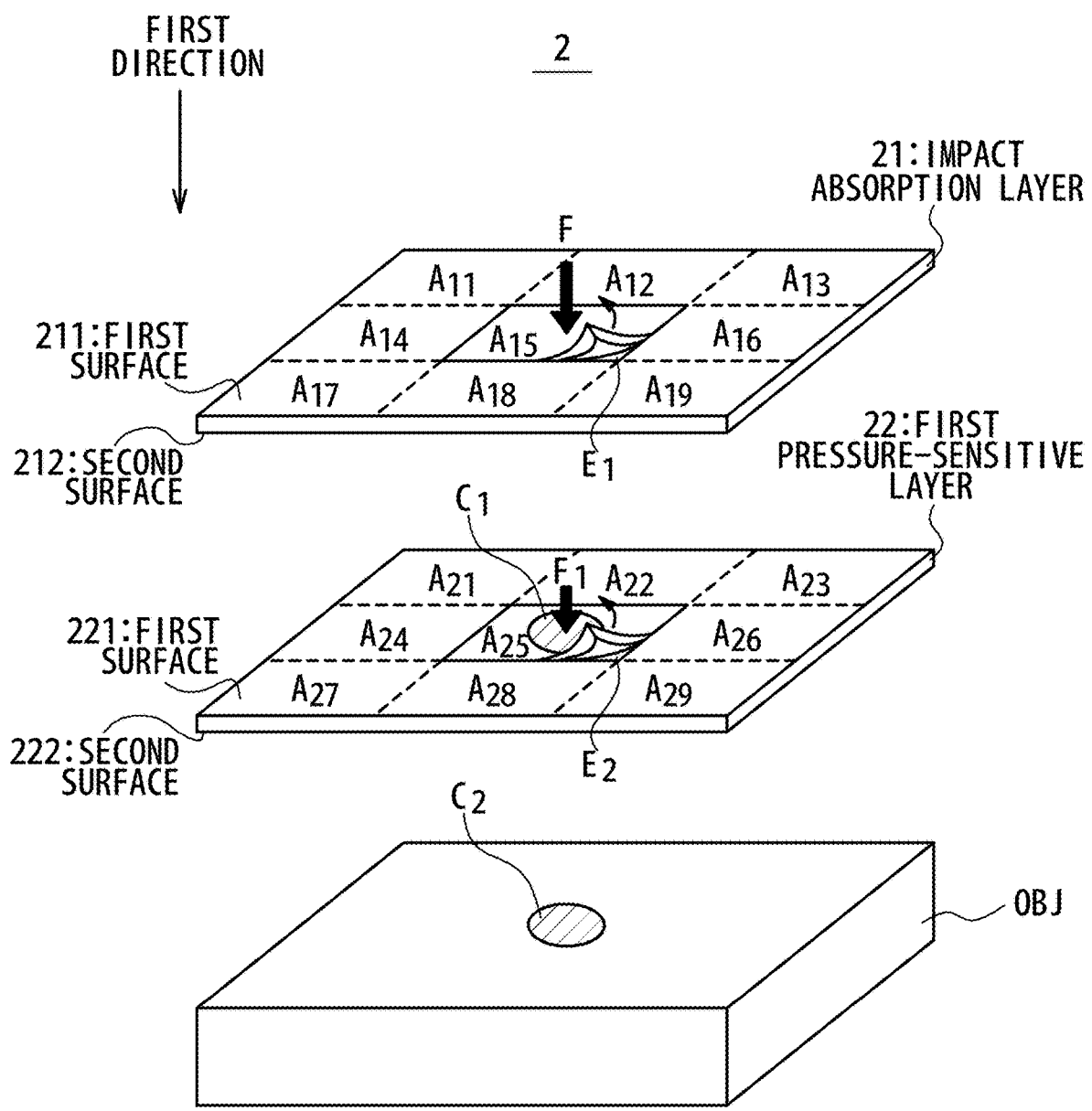
FIG. 5 is an exploded perspective view showing a delamination block of the impact sensing laminate 2.

As described above, the plurality of cut lines are provided on the impact sensing laminate 2. Therefore, a part of the impact sensing laminate 2 can be easily delaminated. The method of delaminating the part of the impact sensing laminate 2 will be described below. FIG. 5 is an exploded perspective view showing a delamination area of the impact sensing laminate 2. Here, the illustration of the adhesion layers 23 and 24 and the microcapsules 223 is omitted in FIG. 5.

For example, as shown in FIG. 5, it is supposed that the impact force F acts on the impact absorption layer 21 (in this case, F · first threshold value). In an example shown in FIG. 5, the impact force F acts on a part of the block $A_{15}$ of the impact absorption layer 21. By the same argument as the argument related to FIG. 3, the worker specify an area (the impact force acting area C1) of the first pressure-sensitive layer 22 on which the impact force $F_1$ to have been attenuated by the impact absorption layer 21 acted. The area $C_2$ of the protection object corresponding to the impact force acting area $C_1$ is an area on which the impact force F acted. In the example shown in FIG. 5, the impact force $F_1$ to have been attenuated by the impact absorption layer 21 acted on a part of the block $A_{25}$ of the first pressure-sensitive layer 22. To inspect the area $C_2$ of the protection object OBJ on which the impact force $F_1$ acted, the worker delaminates the block $A_{15}$ of the impact absorption layer 21 from the impact absorption layer 21, and delaminates the block $A_{25}$ of the first pressure-sensitive layer 22 from the first pressure-sensitive layer 22. No necessity to say, the worker may delaminate both at once from the impact sensing laminate 2 in the condition that the block $A_{15}$ of the impact absorption layer 21 is adhered to the block $A_{25}$ of the first pressure-sensitive layer 22.

The block shown by a symbol $E_1$ in FIG. 5 is called a delamination area. The delamination area $E_1$ is an area formed in the impact absorption layer 21 (of the impact sensing laminate 2) by delaminating the block $A_{15}$ of the impact absorption layer 21 from the impact absorption layer 21 (of the impact sensing laminate 2). In other words, the delamination area $E_1$ is an opening section formed by delaminating a part of the impact absorption layer 21 (the block $A_{15}$). In the example shown in FIG. 5, the size of the delamination area $E_1$ is the same as the size of block $A_{15}$ of the impact absorption layer 21.

The block shown by a symbol $E_2$ in FIG. 5 is called a delamination area. The delamination area $E_2$ is an area formed by delaminating the block $A_{25}$ of the first pressure-sensitive layer 22 from the first pressure-sensitive layer 22 (of the impact sensing laminate 2). In other words, the delamination area $E_2$ is an opening section formed by delaminating a part of the first pressure-sensitive layer 22 (the block $A_{25}$). In the example shown in FIG. 5, the size of the delamination area $E_2$ is the same as the size of the block $A_{25}$ of the first pressure-sensitive layer 22.

A case is considered where a plurality of cut lines are not provided for the impact sensing laminate 2. In this case, the block $A_{15}$ of the impact absorption layer 21 shown in FIG. 5 and the block $A_{25}$ of the first pressure-sensitive layer 22 shown in FIG. 5 are cut off by, for example, a cutter knife (utility knife). However, there is a possibility that the blade of the cutter knife hits to the surface of the protection object OBJ. In such a case, damage may occur in the protection object OBJ. In the first embodiment, a plurality of cut lines are provided for the impact sensing laminate 2. Therefore, when the part of the impact sensing laminate 2 is delaminated, it is possible to prevent the protection object OBJ from being damaged. Note that the use of the cutter knife is not always excluded.

(Supplement Description of Impact Sensing Laminate)

In the example shown in FIG. 4, the shape of impact sensing laminate 2 is rectangular but is not limited to the rectangle. For example, when the impact sensing laminates 2 are arranged to the spar 102 shown in FIG. 1B, the worker can change the shape of impact sensing laminates 2 according to the shape of spar 102. The extent (area) of impact sensing laminate 2 is optional. When the extent (area) of impact sensing laminate 2 is small, the cut lines or the weakened lines may be omitted.

Figure 6:
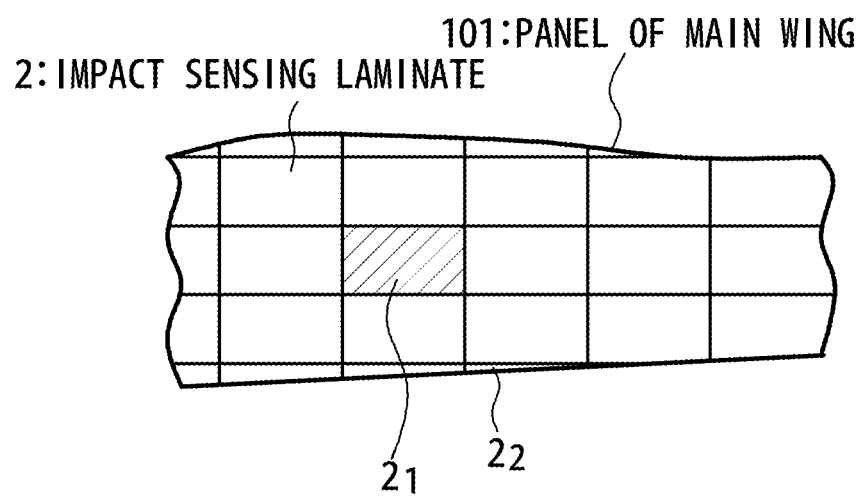
FIG. 6 is a schematic diagram showing an example of arrangement of the impact sensing laminates 2.

FIG. 6 is a schematic diagram showing an example of arranging of the impact sensing laminated 2. For example, it is supposed that the impact sensing laminates 2 are arranged on the panel 101 (the first surface 103) of the main wing 10. Because the main wing 10 is large, the plurality of impact sensing laminates 2 may be arranged over the panel 101, as shown in FIG. 6. The impact sensing laminate 2, shown in FIG. 6 is one of the plurality of impact sensing laminates 2. The impact sensing laminate $2_2$ shown in FIG. 6 is one of the plurality of impact sensing laminates 2 arranged in the end section of the main wing 10. For example, when the impact sensing laminate 2 is arranged in the end section of the protection object OBJ (the end section of the main wing 10), the impact sensing laminate 2 may be cut to fit with the shape of the end section of the main wing 10. When the plurality of impact sensing laminates 2 are arranged on the protection object 2-dimensionally, the periphery of each of the plurality of impact sensing laminates 2 is regarded as cut lines.

2.6. Impact Sensing Method/Protection Object Inspecting Method

Figure 7A:
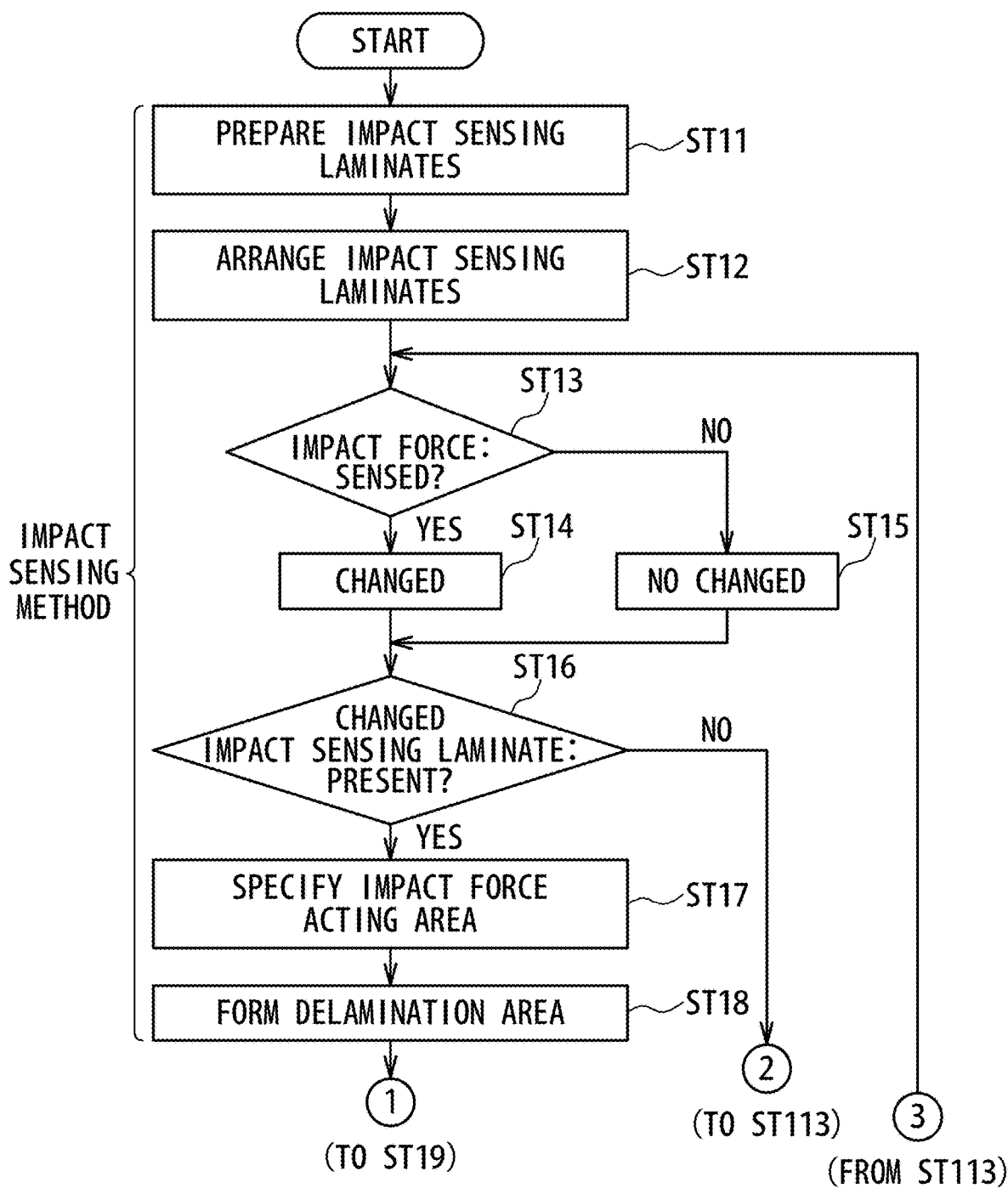
FIG. 7A is a flow chart showing an example of an impact sensing method and an example of a protection object inspecting method.
Figure 7B:
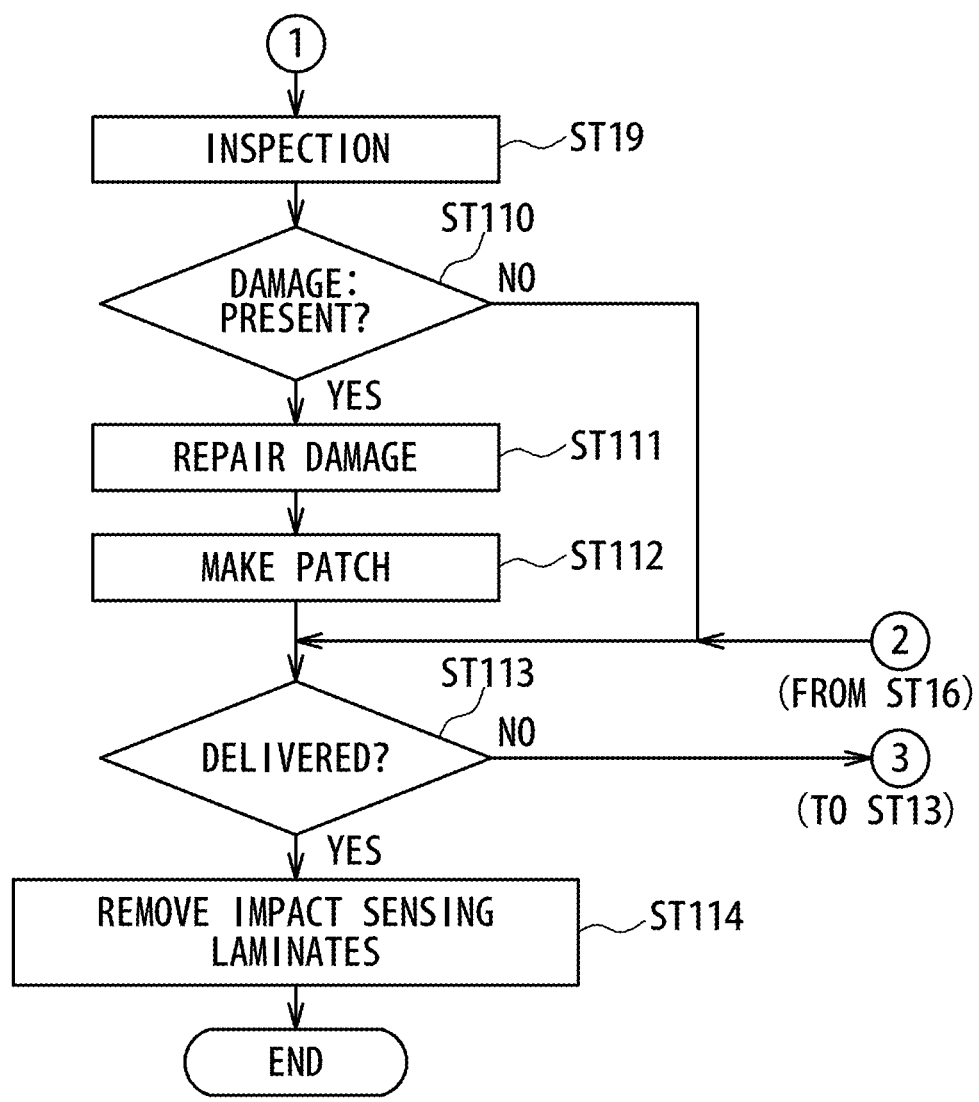
FIG. 7B is a flow chart showing an example of an impact sensing method and an example of a protection object inspecting method.

FIG. 7A and FIG. 7B are a flow chart showing an example of impact sensing method and an example of method of inspecting a protection object.

Appropriately, FIG. 1A to FIG. 6 should be referred to.

To make the description simple, the following matters are presupposed:

1) For example, the protection object OBJ is the first surface 103 of the panel 101, and
2) The assembly of the main wing 10 has been completed.

In the example shown in FIG. 7A and FIG. 7B, the impact sensing method is shown in step ST11 to step ST18. The protection object inspecting method is shown in the step ST11 to step ST114. The protection object inspecting method is a method to which an impact sensing method is applied.

(Step ST11)

First, the worker prepares the plurality of impact sensing laminates 2. For example, the shape of each of the plurality of impact sensing laminates 2 is a rectangle of 100 cm in horizontal×100 cm in vertical. In each impact sensing laminate 2, the impact absorption layer 21 is supposed to be fixed on the first pressure-sensitive layer 22.

(Step ST12)

Next, the worker arranges the plurality of impact sensing laminates 2 on the surface of protection object OBJ (the first surface 103 of the panel 101) (reference to FIG. 6). At this time, the worker fixes the impact sensing laminate 2 on the protection object OBJ by using the adhesion layer 24.

When the first pressure-sensitive layer 22 and the impact absorption layer 21 are prepared individually for the impact sensing laminate 2 at the step ST11, the worker fixes the first pressure-sensitive layer 22 on the protection object OBJ by using the adhesion layer 24, and then, fixes the impact absorption layer 21 on the first pressure-sensitive layer 22 by using the adhesion layer 23.

After the step ST12, it is supposed that, for example, an impact force acts on one of the plurality of impact sensing laminates 2 due to a human error, (ex. the impact sensing laminate $2_1$ shown in FIG. 6). Also, as shown in FIG. 5, it is supposed that the impact force F acts on a part of the block $A_{15}$ of the impact absorption layer 21.

(Step ST13)

Attention is paid to the impact sensing laminate $2_1$ on which the impact force acts (reference to FIG. 6). The first pressure-sensitive layer 22 senses the impact force (the first impact force $F_1$ shown in FIG. 5) to have been attenuated by the impact absorption layer 21. In detail, the first pressure-sensitive layer 22 senses whether or not the magnitude of impact force to have been attenuated by the impact absorption layer 21 exceeds the first threshold value.

(Step ST14)

At the step ST13, when the magnitude of impact force to have been attenuated by the impact absorption layer 21 (the impact force $F_1$ shown in FIG. 5) exceeds the first threshold value (ST13: YES), the first pressure-sensitive layer 22 senses an area of the first pressure-sensitive layer 22 where the magnitude of impact force exceeds the first threshold value (the impact force acting area C1 shown in FIG. 5). In the example shown in FIG. 5, the color of impact force acting area $C_1$ changes from an initial color (ex. colorless) to a specific color (ex. red) in the block $A_{25}$ of the first pressure-sensitive layer 22. Speaking briefly, the color of the first pressure-sensitive layer 22 changes.

(Step ST15)

On the other hand, at the step ST13, when the magnitude of impact force to have been attenuated by the impact absorption layer 21 (the impact force $F_1$ shown in FIG. 5) is smaller than the first threshold value (ST13: NO), any change does not happen in the first pressure-sensitive layer 22. In other words, the color of first pressure-sensitive layer 22 does not change.

(Step ST16)

The worker checks whether a change has occurred in anyone of the plurality of impact sensing laminates 2 arranged in the step ST12. In this case, the impact sensing laminate in which the change has occurred means the impact sensing laminate in which the color of impact force acting area $C_1$ (reference to FIG. 5) changed, and is, for example, the impact sensing laminate $2_1$ shown in FIG. 6. For example, the check of the impact sensing laminate in which the change has occurred is carried out visually. For example, as described above, the impact absorption layer 21 of each impact sensing laminate 2 is a transparent layer. Therefore, it is easy to find the impact sensing laminate in which the change has occurred (the impact sensing laminate $2_1$) from among the plurality of impact sensing laminates 2.

As a result of the check, when the impact sensing laminate in which the change has occurred (the impact sensing laminate $2_1$) from among the plurality of impact sensing laminates 2 is found out (ST16: YES), the flow advances to the following step ST17. On the other hand, when the impact sensing laminate in which the change has occurred is not found out from among the plurality of impact sensing laminates 2 (ST16: NO), the flow advances to step ST113.

(Step ST17)

In case of YES at the step ST16, the following work is carried out to the impact sensing laminate in which the change has occurred (the impact sensing laminate $2_1$). The worker specifies an area of the first pressure-sensitive layer 22 (the impact force acting area $C_1$ shown in FIG. 5) on which the impact force to have been attenuated by the impact absorption layer 21 (the impact force $F_1$ shown in FIG. 5) acted. Because the color of impact force acting area $C_1$ is changed, it is easy to specify the impact force acting area $C_1$. The worker knows that the impact force acting area $C_1$ is in the block $A_{25}$ of the first pressure-sensitive layer 22.

(Step ST18)

Next, the worker forms the delamination area $E_1$ by delaminating the block $A_{15}$ of the impact absorption layer 21 from the impact absorption layer (reference to FIG. 5). Moreover, the worker forms the delamination area $E_2$ by delaminating the block $A_{25}$ of the first pressure-sensitive layer 22 from the first pressure-sensitive layer 22 (reference to FIG. 5). As a result, the area $C_2$ of the protection object is exposed.

(Step ST19)

Next, the worker inspects the area $C_2$ of the protection object OBJ corresponding to the impact force acting area $C_1$ (reference to FIG. 5). For example, the inspection is carried out by using a non-destructive inspection (ex. an ultrasonic inspection).

(Steps ST110 to ST111)

As the result of the inspection, when damage is found out in the area $C_2$ of the protection object OBJ (ST110: YES), the worker repairs the found damage (ST111). In consideration of ease of repairing work, the delamination area of the impact absorption layer 21 may be extended wider than the present delamination area $E_1$. The same is true in the delamination area of the first pressure-sensitive layer 22. On the other hand, when there is not damage in the area $C_2$ of the protection object OBJ (ST110: NO), the flow advances to the step ST113.

(Step ST112)

When the damage of the area $C_2$ of the protection object OBJ is repaired at the step ST111, the periphery of the area $C_2$ of the protection object OBJ is exposed. Therefore, there is a fear that the exposed area of the protection object OBJ (the area of the protection object corresponding to both of the delamination area $E_1$ and the delamination area $E_2$) is damaged again. Therefore, the worker makes a patch on the exposed area of the protection object OBJ so that the exposed area of the protection object OBJ is covered or blockaded. In other words, the impact sensing laminate in which the delamination area was formed (a part except for the patch) is reused. The configuration of patch is the same as the configuration of impact sensing laminate 2 (reference to FIG. 5). The size of the patch is the same as the delamination area (the delamination area $E_1$ and the delamination area $E_2$). Alternatively, the impact sensing laminate which is wider than the delamination area or all of the impact sensing laminates containing the delamination area may be replaced with new impact sensing laminates.

(Steps ST113 to ST114)

When the aircraft 1 is delivered (ST113: YES), the worker removes the plurality of impact sensing laminates 2 arranged on the whole surface of the protection object OBJ (the first surface 103 of the panel 101). The plurality of removed impact sensing laminates 2 may be reused for another aircraft at the step ST11. In other words, the impact sensing laminates 2 in which the delamination areas $E_1$ and $E_2$ have been formed are reused for sensing the next impact force that acts on the impact sensing laminates 2. On the other hand, when the aircraft 1 is not yet delivered (ST113: NO), the flow returns to the step ST13.

A case where the number of impact sensing laminates is plural is given as the example. However, the number of impact sensing laminates may be one. When the number of impact sensing laminates is one, the step ST16 is unnecessary.

According to the first embodiment, it is possible to easily know whether or not the impact force acted on the protection object. Therefore, it is possible to save a work to inspect once again the area of the protection object on which the impact force does not act. As a result, while maintaining the precision of the inspection, the efficiency of inspection can be improved.

3. Second Embodiment

A second embodiment differs from the first embodiment in that the impact sensing laminate has two pressure-sensitive layers. The accuracy of sensing of the impact force can be improved by providing the two pressure-sensitive layers. Moreover, it becomes easy to specify a part on which the impact force acted. The details of the second embodiment are as follows.

3.1. Configuration

Figure 8:
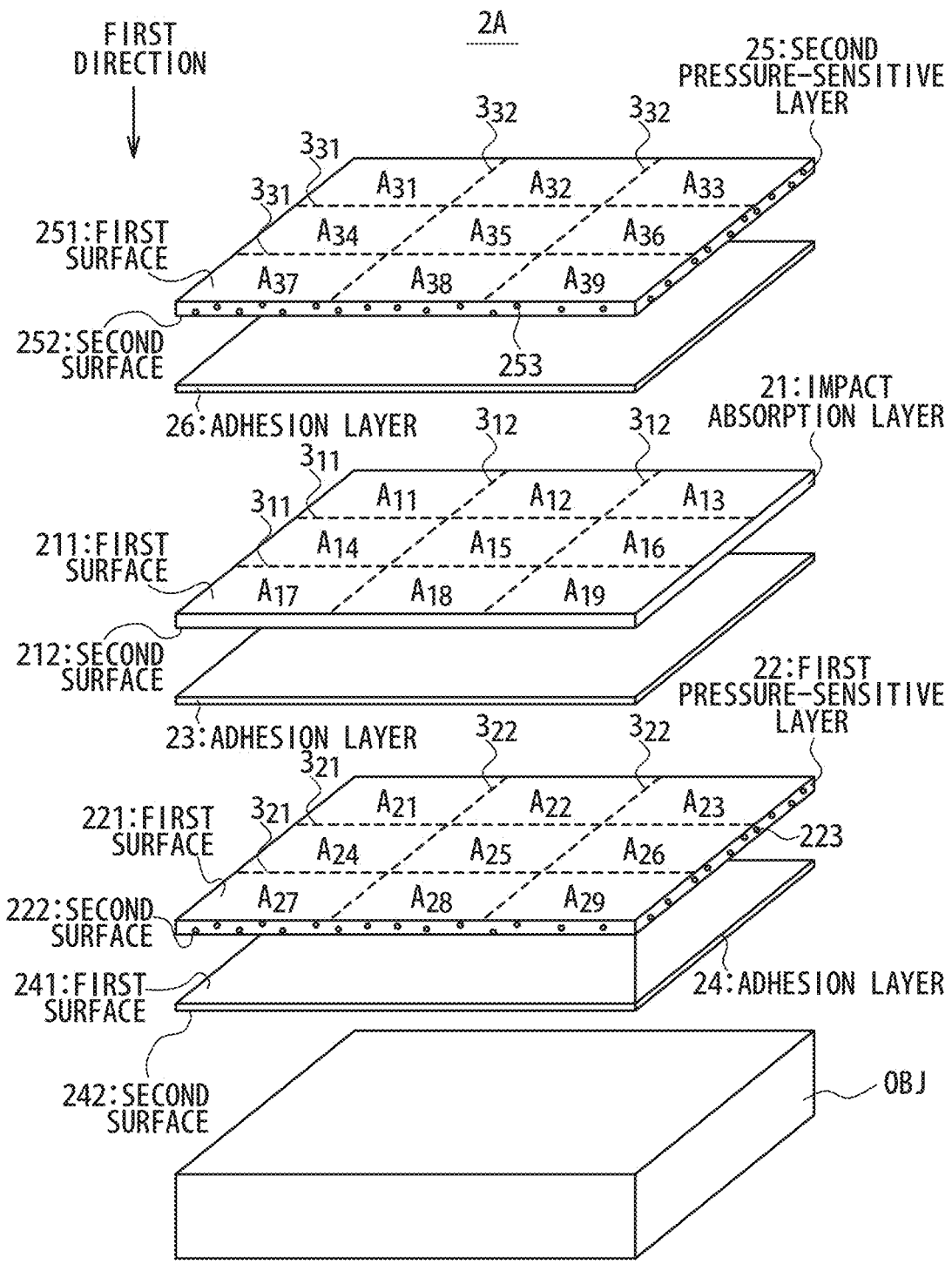
FIG. 8 is an exploded perspective view showing an example of configuration of an impact sensing laminate 2A.

FIG. 8 is an exploded perspective view showing an example of configuration of an impact sensing laminate 2A. In the example shown in FIG. 8, the impact sensing laminate 2A has a second pressure-sensitive layer 25 in addition to the impact absorption layer 21, the first pressure-sensitive layer 22, the surface on which the impact force acts and the surface brought in contact with the protection object OBJ. Additionally, the impact sensing laminate 2A has an adhesion layer 26 in addition to the adhesion layer 23 and the adhesion layer 24. The surface on which the impact force acts is a first surface 251 of the second pressure-sensitive layer 25. The surface brought in contact with the protection object OBJ is a second surface 242 of the adhesion layer 24.

(Second Pressure-Sensitive Layer)

The second pressure-sensitive layer 25 is arranged on the impact absorption layer 21 through the adhesion layer 26. The second pressure-sensitive layer 25 has the first surface 251, and a second surface 252 opposing to the first surface 251. In the following point, the second pressure-sensitive layer 25 is similar to the first pressure-sensitive layer 22.

The similar points are as follows:

1) The second pressure-sensitive layer 25 is a pressure-sensitive film (ex. pressure-sensitive paper) which includes a plurality of microcapsules 253 and developer (not shown). The second pressure-sensitive layer 25 is sufficient to contain a color former.

2) The second pressure-sensitive layer 25 is a layer that can be delaminated from the impact absorption layer 21. For example, the second pressure-sensitive layer 25 may be a layer that can be delaminated from the impact absorption layer 21 by a hand without using any tool.

3) The second pressure-sensitive layer 25 is a layer used to notify that the impact force exceeding a second threshold value acted on itself, by changing the color of the second pressure-sensitive layer 25. When the impact force exceeding the second threshold value acts on the second pressure-sensitive layer 25, the color of the second pressure-sensitive layer 25 in the area on which the impact force acted changes from the initial color (ex. colorless) to the specific color (ex. red). Also, according to the magnitude of impact force that acts on the second pressure-sensitive layer 25, the color density changes.

4) The second pressure-sensitive layer 25 having the second threshold value is attained by, for example, adjusting the strength or size of each of microcapsules 253.

5) The second pressure-sensitive layer 25 is divided into nine blocks $A_{31}$ to $A_{39}$, and has four cut lines $3_{31}$ and $3_{32}$ to surround each of the nine blocks $A_{31}$ to $A_{39}$.

However, the second pressure-sensitive layer 25 differs from the first pressure-sensitive layer 22 in the following points. Firstly, the roles of both are different. The second pressure-sensitive layer 25 has a role to sense the impact force that acted on the second pressure-sensitive layer 25 from the outside of the impact sensing laminate 2A. In other words, the second pressure-sensitive layer 25 is a layer to sense the impact force before the attenuation (a second impact force) by the impact absorption layer 21. It is found immediately by the second pressure-sensitive layer 25 that the impact force acted on the impact sensing laminate 2. This is useful for the worker. For example, when the color of the impact absorption layer 21 is not colorless, it may be difficult for the worker to check whether or not there is a change of the color of the first pressure-sensitive layer 22 through the impact absorption layer 21. The whole of impact absorption layer 21 will have to be delaminated. However, because the second pressure-sensitive layer 25 is provided, the worker can easily and visually know that the impact force acted on the impact sensing laminate 2A.

Secondly, the second threshold value of the second pressure-sensitive layer 25 is given. The second threshold value of the second pressure-sensitive layer 25 is different from the first threshold value of the first pressure-sensitive layer 22. For example, the second threshold value is larger than the first threshold value.

Examples when the second threshold value is larger than the first threshold value will be given. The first threshold value will be first described. It has been described in the first embodiment that the permissible magnitude of impact force is 163 kg (·360 pounds) per unit area when the protection object OBJ is the main wing. Therefore, the first threshold value of the first pressure-sensitive layer 22 is set to 163 kg per unit area. Next, the second threshold value will be described. For example, it is supposed that the impact absorption layer 21 attenuates the impact force that acts on itself to be equal to or less than $2/3$ of the magnitude of impact force. If the magnitude of impact force that acts on the impact absorption layer 21 (per unit area) is 245 kg (·540 pounds), the magnitude of impact force to have been attenuated by the impact absorption layer 21 becomes 163 $\{=245\times(2/3)\}$ kg. Therefore, the second threshold value is set to 245 $(=163\times3/2)$ kg. In other words, when attenuating to be equal to or less than $2/3$ of the magnitude of impact force that acts on the impact absorption layer 21, the second threshold value is set to $3/2$ times of the magnitude of impact force that acts on the impact absorption layer 21. In consideration that the magnitude of impact force is attenuated by the impact absorption layer 21, the second threshold value is set to a value higher than the first threshold value. This means the sensing level of the impact force by the second pressure-sensitive layer 25 is higher than the sensing level of the impact force by the first pressure-sensitive layer 22.

The second threshold value may be smaller than the first threshold value. For example, the second threshold value may be $2/3$ of the first threshold value. When the second threshold value is smaller than the first threshold value, the precision of the sensing of the impact force is improved.

The thickness of the second pressure-sensitive layer 25 and the thickness of the first pressure-sensitive layer 22 may be identical or may be different from each other. For example, to obtain a desirable first threshold value, the thickness of the first pressure-sensitive layer 22 is sometimes adjusted. Such a thing is the same in the second threshold value. As a result, the thickness of the second pressure-sensitive layer 25 is sometimes different from the thickness of the first pressure-sensitive layer 22. Also, the material of the second pressure-sensitive layer 25 may be the same as or may be different from the material of the first pressure-sensitive layer 22 (ex. a kind of the pressure-sensitive film). Like the argument of the thickness, the material of the second pressure-sensitive layer 25 is sometimes different from that of the first pressure-sensitive layer 22. To prevent erroneous sensing of the second pressure-sensitive layer 25, for example, the first surface 251 of the second pressure-sensitive layer 25 may be coated.

(Impact Absorption Layer)

The impact absorption layer 21 is arranged between the first pressure-sensitive layer 22 and the second pressure-sensitive layer 25. The impact absorption layer 21 attenuates the impact force transmitted from the second pressure-sensitive layer 25 to be equal to or less than $2/3$, for example, and transmits the attenuated impact force to the first pressure-sensitive layer 22. In other words, the impact absorption layer 21 attenuates an impact force of the $3/2$ $(=1.5)$ times of a permissible impact force to the permissible impact force or below to transmit to the first pressure-sensitive layer 22. Here, the permissible impact force is, for example, the impact force per unit area which is permissible to the protection object OBJ. As mentioned above, the permissible impact force is determined based on the standard of aircraft to be manufactured. When the protection object OBJ is the main wing, for example, the magnitude of the permissible impact force is 163 kg (·360 pounds) per unit area.

(Adhesion Layer)

The adhesion layer 26 has a role to fix the second pressure-sensitive layer 25 on the impact absorption layer 21. The configuration of adhesion layer 26 is same as the configuration of the adhesion layer 23 (or, the configuration of adhesion layer 24). The adhesion layer 26 may be an adhesive layer applied to the second surface 252 of the second pressure-sensitive layer 25 or an adhesive layer applied on the first surface 211 of the impact absorption layer 21.

(Delamination Area)

Figure 9:
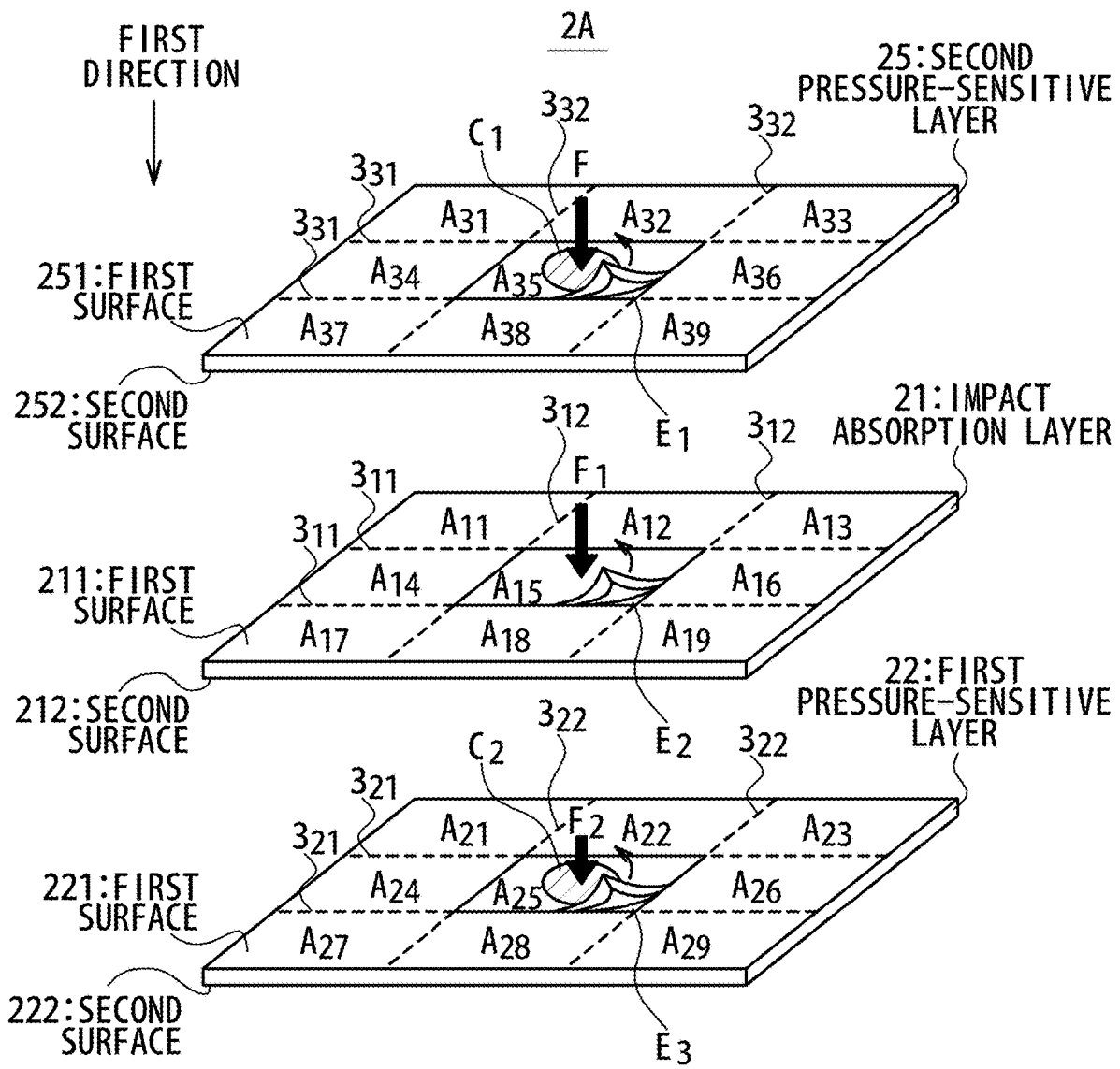
FIG. 9 is an exploded perspective view showing a delamination block of the impact sensing laminate 2A.

FIG. 9 is an exploded perspective view showing the delamination areas of the impact sensing laminate 2A. In this case, the adhesion layers 23, 24, and 26 and the microcapsules 223 and 253 are omitted in FIG. 9. The description of FIG. 9 is different from that of FIG. 5 in the point that the second pressure-sensitive layer 25 is added. Also, the reference numeral of the impact force acting area and the reference numeral of the delamination area are changed. Regarding the other points, the description of FIG. 9 is same as that of FIG. 5.

The action of the impact force F on the impact sensing laminate 2A will be described. The argument of the action is same as the argument made with reference to FIG. 3.

That is,

1) The area $C_1$ shown by the slanted lines in FIG. 9 shows the area of the second pressure-sensitive layer 25 on which the impact force F acted (impact force acting area $C_1$: a second impact force acting area). The impact force transmitted to the second pressure-sensitive layer 25 is transmitted to the impact absorption layer 21. In the example shown in FIG. 9, the impact force transmitted to the impact absorption layer 21 is shown as the impact force $F_1$.

2) The impact force $F_1$ is attenuated by the impact absorption layer 21. In the example shown in FIG. 9, the impact force to have been attenuated by the impact absorption layer 21 is shown as the impact force $F_2$ ($F_2 < F_1$).

3) The impact force $F_2$ is transmitted to the first pressure-sensitive layer 22. The area $C_2$ shown by the slanted line in FIG. 9 shows an area of the first pressure-sensitive layer 22 on which the impact force $F_2$ acted (the impact force acting area $C_2$: the first impact force acting area).

4) Moreover, the impact force $F_2$ is transmitted from the first pressure-sensitive layer 22 to the protection object OBJ. The area $C_3$ shown by the slanted lines in FIG. 9 shows the area of the protection object OBJ on which the impact force $F_3$ acted.

For example, it is supposed that the impact force F acts on a part of the block $A_{35}$ of the second pressure-sensitive layer 25 (F · the second threshold value), as shown in FIG. 9. The worker specifies the area of the second pressure-sensitive layer 25 on which the impact force F acted (the impact force acting area $C_1$). The existence of impact force acting area $C_1$ means that the impact force F acted on the impact sensing laminate 2A. The worker knows that the impact force acting area $C_1$ is in the block $A_{35}$ of the second pressure-sensitive layer 25. Therefore, the worker delaminates the block $A_{35}$ of the second pressure-sensitive layer 25 from the second pressure-sensitive layer 25. The block $A_{15}$ of the impact absorption layer 21 can be inspected by delaminating the block $A_{35}$ of the second pressure-sensitive layer 25. In the second embodiment, the color of the impact absorption layer 21 may be colorless. In this case, the block $A_{25}$ of the first pressure-sensitive layer 22 can be inspected without delaminating the block $A_{15}$ of the impact absorption layer 21.

When the color of the impact force acting area $C_2$ has changed in the block $A_{25}$ of the first pressure-sensitive layer 22, this means that the impact force which is larger than the permissible impact force acted on the protection object OBJ. In this case, the worker delaminates the block $A_{15}$ of the impact absorption layer 21 from the impact absorption layer 21, and delaminates the block $A_{25}$ of the first pressure-sensitive layer 22 from the first pressure-sensitive layer 22. Then, the worker inspects the area $C_3$ of the protection object OBJ corresponding to the block $A_{25}$ of the first pressure-sensitive layer 22.

The area shown by a symbol $E_1$ in FIG. 9 is called the delamination area. The delamination area $E_1$ is an area formed in the second pressure-sensitive layer 25 by delaminating the block $A_{35}$ of the second pressure-sensitive layer 25 from the second pressure-sensitive layer 25 (the impact sensing laminate 2A). In other words, the delamination area $E_1$ is an opening section formed by delaminating a part (the block $A_{35}$) of the second pressure-sensitive layer 25. In the example shown in FIG. 9, the size of the delamination area $E_1$ is the same as the size of block $A_{35}$ of the second pressure-sensitive layer 25.

The area shown by a symbol $E_2$ in FIG. 9 is called the delamination area. The delamination area $E_2$ is an area formed by delaminating the block $A_{15}$ of the impact absorption layer 21 from the impact absorption layer 21. In other words, the delamination area $E_2$ is an opening section formed by delaminating a part (the block $A_{15}$) of the impact absorption layer 21. In the example shown in FIG. 9, the size of the delamination area $E_2$ is the same as that of the block $A_{15}$ of the impact absorption layer 21.

The area shown by a symbol $E_3$ in FIG. 9 is called the delamination area. The delamination area $E_3$ is an area formed by delaminating the block $A_{25}$ of the first pressure-sensitive layer 22 from the first pressure-sensitive layer 22. In other words, the delamination area $E_3$ is an opening section formed by delaminating a part (the block $A_{25}$) of the first pressure-sensitive layer 22. In the example shown in FIG. 9, the size of the delamination area $E_3$ is the same as the size of block $A_{25}$ of the first pressure-sensitive layer 22.

3.2. Impact Sensing Method/Protection Object Inspecting Method

Figure 10A:
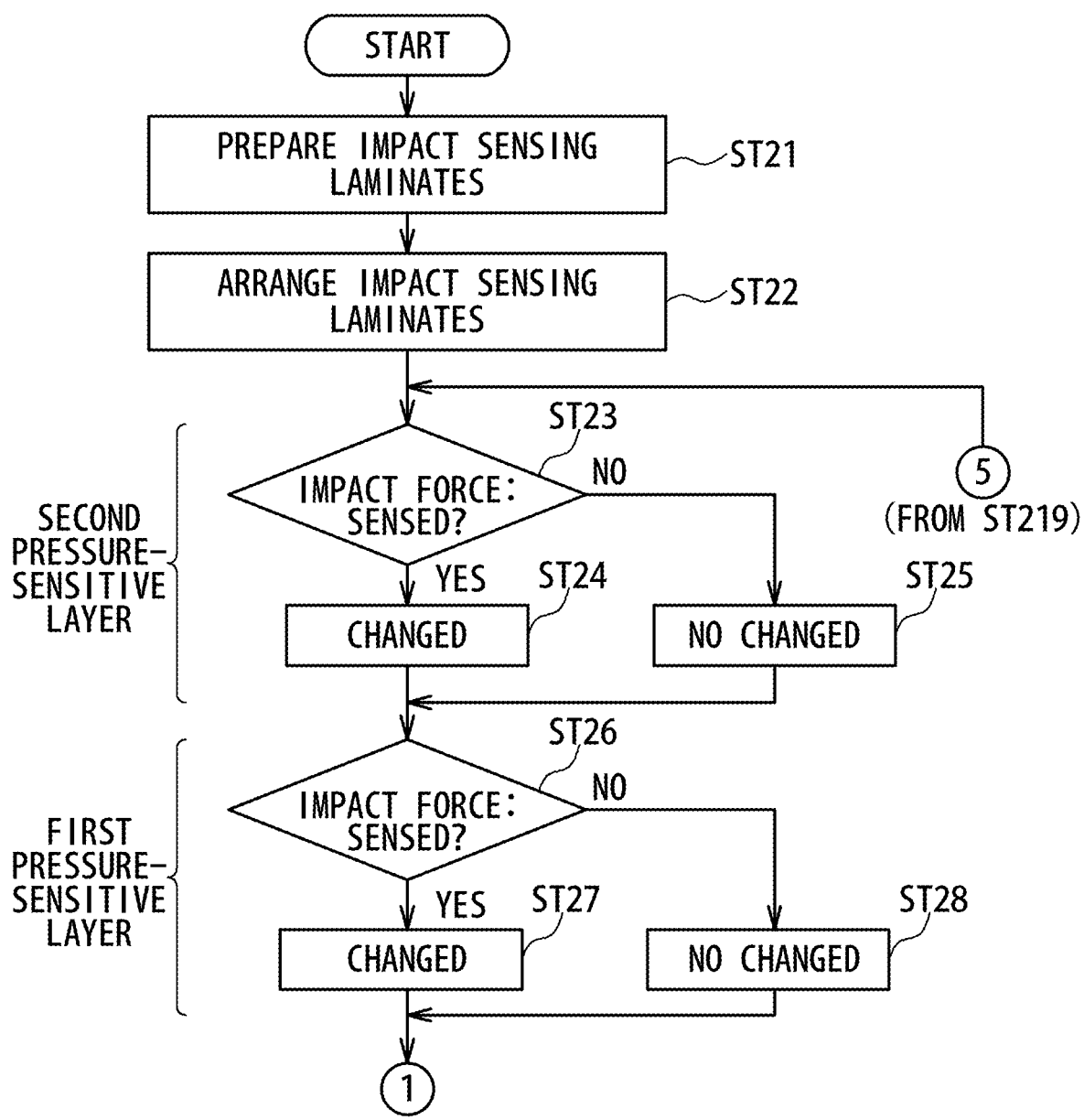
FIG. 10A is a flow chart showing an example of the impact sensing method and an example of the protection object inspecting method.
Figure 10B:
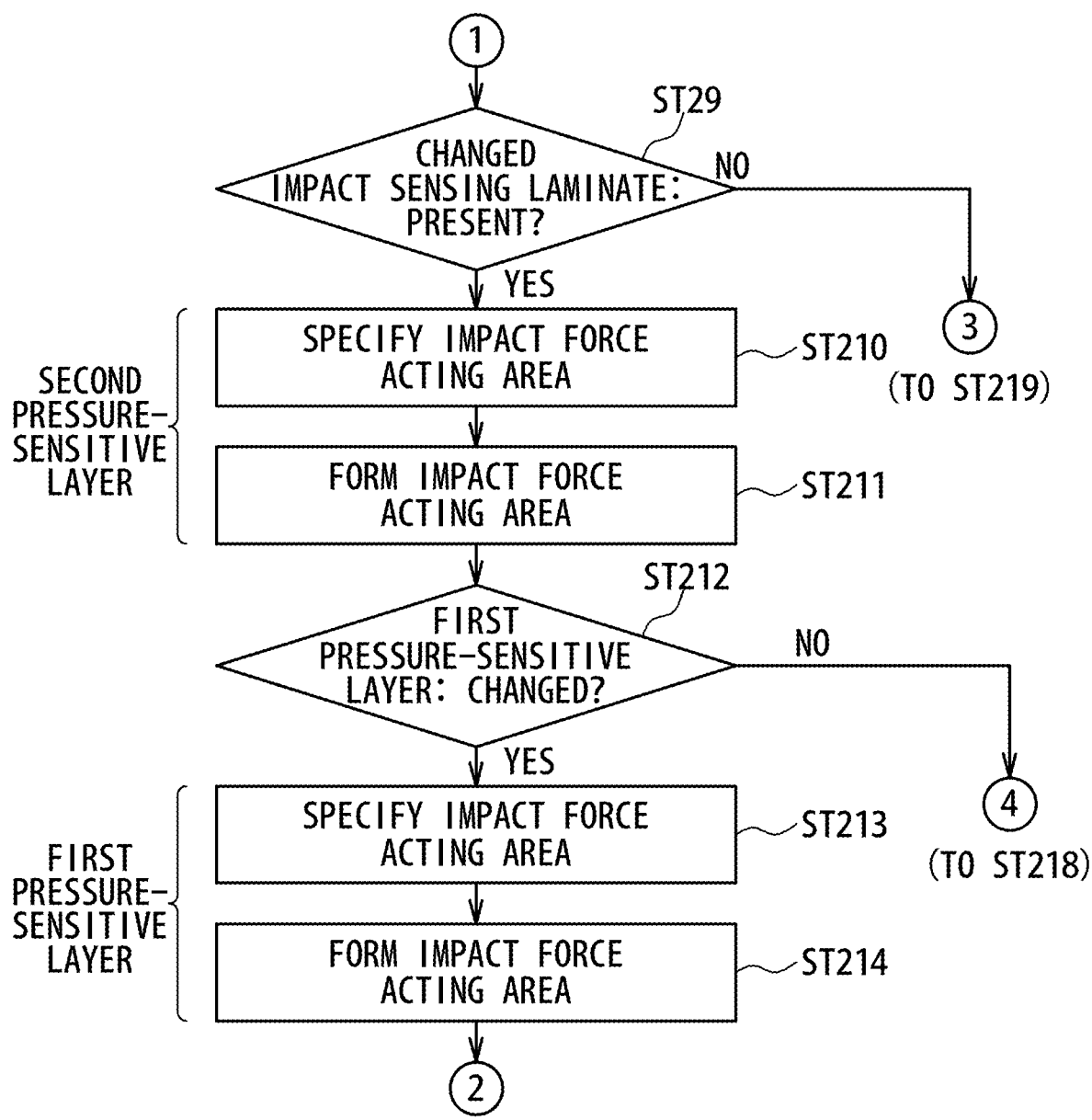
FIG. 10B is a flow chart showing an example of the impact sensing method and an example of the protection object inspecting method.
Figure 10C:
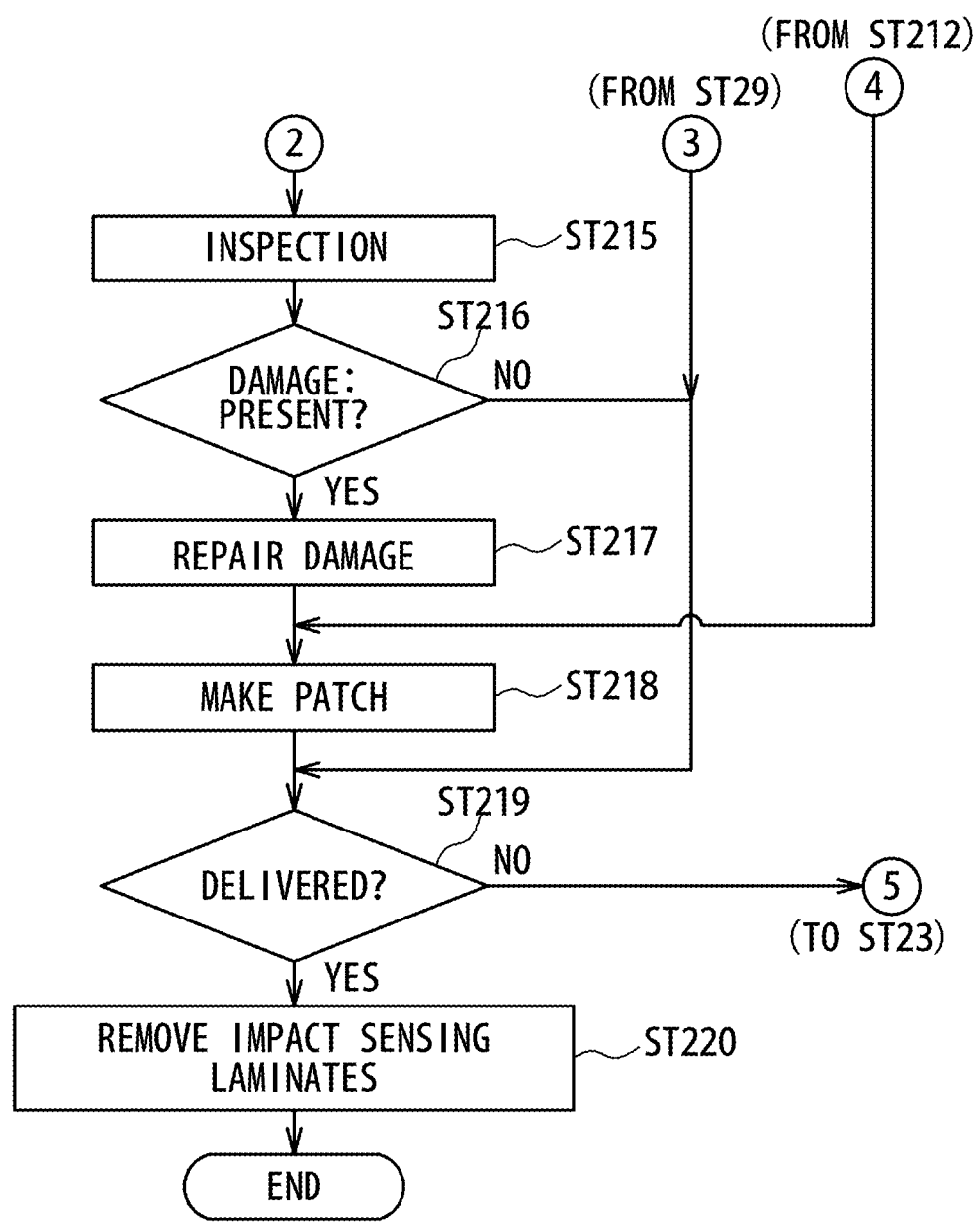
FIG. 10C is a flow chart showing an example of the impact sensing method and an example of the protection object inspecting method.

FIG. 10A, FIG. 10B and FIG. 10C show a flow chart of an example of an impact sensing method and an example of a protection object inspecting method. FIG. 1B, FIG. 6, FIG. 8 and FIG. 9 should be appropriately referred to.

Regarding the impact sensing method and the protection object inspecting method, the second embodiment is different from the first embodiment in the following points.

1) In an example shown in FIG. 10A to FIG. 10C, the impact sensing method has step ST21 to step ST214. The protection object inspecting method has step ST21 to step ST220.

2) In the second embodiment, the impact sensing laminate has two pressure-sensitive layers.

Therefore, there are steps (ST23-ST25, ST210-ST211) of the second pressure-sensitive layer 25, and steps (ST26-ST28, ST213-ST214) of the first pressure-sensitive layer 22. The step ST212 is a step added newly.

(Step ST21)

First, the worker prepares the plurality of impact sensing laminates 2A (reference to FIG. 8). In each of the impact sensing laminates 2A, it is supposed that the second pressure-sensitive layer 25 has been fixed on the impact absorption layer 21, and moreover, the impact absorption layer 21 has been fixed on the first pressure-sensitive layer 22.

(Step ST22)

Next, the worker arranges the plurality of impact sensing laminates 2A on the surface of the protection object OBJ (ex. the first surface 103 of the panel 101).

When the impact absorption layer 21, the first pressure-sensitive layer 22 and the second pressure-sensitive layer 25 are individually prepared for each impact sensing laminate 2A in the step ST21, the worker fixes the first pressure-sensitive layer 22 on the protection object OBJ by using the adhesion layer 24, and then, fixes the impact absorption layer 21 on the first pressure-sensitive layer 22 by using the adhesion layer 23, and lastly, fixes the second pressure-sensitive layer 25 on the impact absorption layer 21 by using the adhesion layer 26.

It is supposed that the impact force acts on one of the plurality of impact sensing laminates 2A (ex. the impact sensing laminate 2A in a slanted line part in FIG. 6) due to, for example, a human error after the step ST22. Also, as shown in FIG. 9, it is supposed that the impact force F acts on a part of the block $A_{35}$ of the second pressure-sensitive layer 25.

(Step ST23: Second Pressure-Sensitive Layer)

Attention is paid on one of the plurality of impact sensing laminates 2A on which the impact force acts. The second pressure-sensitive layer 25 senses the impact force before being attenuated by the impact absorption layer 21 (the impact force F shown in FIG. 9: second impact force). In detail, the second pressure-sensitive layer 25 senses whether or not the magnitude of impact force before being attenuated by the impact absorption layer 21 exceeds the second threshold value.

(Step ST24: Second Pressure-Sensitive Layer)

At step ST23, when the magnitude of impact force (the impact force F shown in FIG. 9) exceeds the second threshold value (ST23: YES), the second pressure-sensitive layer 25 senses an area of the second pressure-sensitive layer 25 where the magnitude of impact force exceeds the second threshold value (the impact force acting area $C_1$ shown in FIG. 9: the second impact force acting area). In the example shown in FIG. 9, the color of impact force acting area $C_1$ changes from the initial color (ex. colorless) to the specific color (ex. red) in the block $A_{35}$ of the second pressure-sensitive layer 25. Speaking briefly, the color of the second pressure-sensitive layer 25 is changed.

(Step ST25: Second Pressure-Sensitive Layer)

On the other hand, at the step ST23, when the magnitude of impact force (the impact force F shown in FIG. 9) is smaller than the second threshold value (ST25: NO), the change does not occur in the second pressure-sensitive layer 25. In other words, the color of the second pressure-sensitive layer 25 does not change.

(Step ST26: First Pressure-Sensitive Layer)

The first pressure-sensitive layer 22 senses the impact force to have been attenuated by the impact absorption layer 21 (impact force $F_2$ shown in FIG. 9: first impact force). In detail, the first pressure-sensitive layer 22 senses whether or not the magnitude of impact force to have been attenuated by the impact absorption layer 21 exceeds the first threshold value.

(Step ST27: First Pressure-Sensitive Layer)

At step ST26, when the magnitude of impact force to have been attenuated by the impact absorption layer 21 (the impact force $F_2$ shown in FIG. 9) exceeds the first threshold value (ST26: YES), the first pressure-sensitive layer 22 senses the area of the first pressure-sensitive layer 22 (the impact force acting area $C_2$ shown in FIG. 9: the first impact force acting area) where the magnitude of impact force exceeds the first threshold value. In the example shown in FIG. 9, the color of the impact force acting area $C_2$ changes from the initial color (ex. colorless) to the specific color (ex. red) in the block $A_{25}$ of the first pressure-sensitive layer 22. Speaking briefly, a change occurs in the first pressure-sensitive layer 22.

(Step ST28: First Pressure-Sensitive Layer)

On the other hand, at step ST26, when the magnitude of impact force (the impact force $F_2$ shown in FIG. 9) to have been attenuated by the impact absorption layer 21 is smaller than the first threshold value (ST26: NO), any change does not occur in the first pressure-sensitive layer 22. In other words, the color of the first pressure-sensitive layer 22 does not change.

(Step ST29)

The worker checks whether or not there are any of the plurality of impact sensing laminates 2 in which the change has occurred at the step ST22. The impact sensing laminate is one in which the color of the impact force acting area $C_1$ (referring to FIG. 9) of the second pressure-sensitive layer 25 has changed. As the result of the check, when the impact sensing laminate whose color has changed, is found out from among the plurality of impact sensing laminates 2 (ST29: YES), the flow advances to the next step ST210. On the other hand, when there is not the impact sensing laminate in which the color has changed, in the plurality of impact sensing laminates 2 (ST29: NO), the flow advances to the step ST219.

(Step ST210)

In case of YES at the step ST29, the following work is carried out to the impact sensing laminate in which the color has changed (reference to FIG. 9). The worker specifies the area of the second pressure-sensitive layer 25 on which the impact force F acted (the impact force acting area $C_1$ shown in FIG. 9: the second impact force acting area). In other words, the color of impact force acting area $C_1$ has changed. This means that the impact force acted on the impact sensing laminate 2A. Because the color of impact force acting area $C_1$ has changed, it is easy to visually specify the impact force acting area $C_1$. The worker knows that impact force acting area $C_1$ is in the block $A_{35}$ of the second pressure-sensitive layer 25.

(Step ST211)

Next, the worker delaminates the block $A_{35}$ of the second pressure-sensitive layer 25 from the second pressure-sensitive layer 25 to form the delamination area $E_1$ (the first the delamination area) (reference to FIG. 9). As a result, the block $A_{15}$ of the impact absorption layer 21 is exposed.

(Step ST212)

At the step ST211, the block $A_{15}$ of the impact absorption layer 21 has been exposed. Therefore, the worker checks the block $A_{25}$ of the first pressure-sensitive layer 22 which is under the block $A_{15}$ of the impact absorption layer 21. In a current stage, the worker does not have to delaminate the block $A_{15}$ of the impact absorption layer 21 from the impact absorption layer 21, to see the block $A_{25}$ of the first pressure-sensitive layer 22. For example, here, the color of impact absorption layer 21 is colorless.

As the result of the check, when there is an area where the color has changed in the block $A_{25}$ of the first pressure-sensitive layer 22 (ST212: YES), the worker finds that the impact force exceeding the first threshold value has acted on the protection object OBJ. In this case, the flow advances to the following step ST213. On the other hand, when there is not an area where the color has changed, in the block $A_{25}$ of the first pressure-sensitive layer 22 (ST212: NO), the flow advances to the step ST218.

When being NO at the step ST212, it can be found that the magnitude of impact force F (referring to FIG. 9) has been attenuated to be smaller than the first threshold value by the impact absorption layer 21. In other words, the impact force F has been made smaller than the permissible impact force by the impact absorption layer 21. Even if the impact force acts on the protection object OBJ, the possibility that the damage occurs in the protection object OBJ is small. In this case, the worker does not have to inspect the impact force acting area $C_2$ (referring to FIG. 9). Therefore, the inspection becomes more efficient.

(Step ST213)

When being YES at the step ST212, the worker specifies the area of the first pressure-sensitive layer 22 on which the impact force to have been attenuated by the impact absorption layer 21 (the impact force $F_2$ shown in FIG. 9) has acted (the impact force acting area $C_2$ shown in FIG. 9: the first impact force acting area). In other words, the worker specifies the impact force acting area $C_2$ (the first impact force acting area) from the delamination area $E_1$ (the first delamination area) formed at the step ST211. Because the color of impact force acting area $C_2$ has changed, it can be found that the impact force acted on the protection object OBJ. Also, by checking the color density of the impact force acting area $C_2$, the worker can estimate the magnitude of impact force that has acted on the protection object OBJ. Therefore, the contents of inspection can be changed at the following step ST215 according to the estimated magnitude of the impact force. For example, when the estimated magnitude of the impact force is small, the usual inspection (ex. an ultrasonic inspection) can be changed to a simple inspection (ex. a visual inspection).

(Step ST214)

Next, the worker delaminates the block $A_{15}$ of the impact absorption layer 21 from the impact absorption layer 21 to form the delamination area $E_2$ (reference to FIG. 9). Moreover, the worker delaminates the block $A_{25}$ of the first pressure-sensitive layer 22 from the first pressure-sensitive layer 22 to form the delamination area $E_3$ (reference to FIG. 9). Therefore, the block $C_3$ of the protection object is exposed.

(Step ST215)

Next, the worker inspects the area $C_3$ of the protection object OBJ corresponding to the impact force acting area $C_2$ (the first impact force acting area) (reference to FIG. 9).

(Steps ST216 to ST217)

As the result of the inspection, when damage is found in the area C3 of the protection object OBJ (ST216: YES), the worker repairs the found damage (ST217). On the other hand, when there is not any damage in the area $C_3$ of the protection object OBJ (ST216: NO), the flow advances to step ST219.

(Step ST218)

When the damage of the area $C_3$ of the protection object OBJ has been repaired at the step ST217, the periphery of the area $C_3$ of the protection object OBJ has been exposed. The worker makes a patch to the exposed area of the protection object OBJ to cover or blockade the exposed area of the protection object OBJ (the area of the protection object OBJ corresponding to the delamination areas $E_1$ to $E_3$). The configuration of the patch is the same as the configuration of impact sensing laminate 2A (reference to FIG. 8). The size of patch is the same as the size of the delamination areas (the delamination areas $E_1$ to $E_3$). When there is not an area where the color has changed in the block $A_{25}$ of the first pressure-sensitive layer 22 (Step ST212: NO), the delamination area is only the delamination area $E_1$ shown in FIG. 9. Therefore, the patch is made to cover the delamination area $E_1$. As mentioned above, the impact sensing laminate 2A in which the delamination areas $E_1$ to $E_3$ were formed can be reused for sensing the next impact force which acts on the impact sensing laminate 2A.

(Steps ST219 to ST220)

When the aircraft 1 is delivered (ST219: YES), the worker removes the plurality of impact sensing laminates 2A arranged on the surface of the protection object OBJ (the first surface 103 of the panel 101). The removed impact sensing laminates 2A may be reused at the step ST21 to another aircraft. On the other hand, when the aircraft 1 is not yet delivered (ST219: NO), the flow returns to the step ST23.

In the above-mentioned description, a case that the number of impact sensing laminates is plural is given as an example. However, the number of impact sensing laminates may be one. When the number of impact sensing laminates is one, the step ST29 is unnecessary. In case of NO at the step ST212, the flow may advance to the step ST219 in place of the step ST218.

According to the second embodiment, the accuracy of the sensing of the impact force can be improved in addition to sensing the impact force. Specifically, two of the pressure-sensitive layers are provided and the impact force is sensed by the two pressure-sensitive layers. In the example shown in FIG. 9, the impact force F which actually acted externally is sensed by the second pressure sensitive paper 25. Therefore, the specifying of a part on which the impact force acts becomes easy. For example, this easiness connects with the improvement of a main wing assembling work and the improvement of a rigging work. Also, to provide the two pressure-sensitive layers makes the double checking of the sensing of the impact force possible. Moreover, the second threshold value of the second pressure sensitive paper 25 is different from the first threshold value of the first pressure-sensitive layer 22. Because the two threshold values are different from each other, the precision of the sensing of the impact force improves. Especially, because large impact force is sensed when the second threshold value is larger than the first threshold value, the reliability of the inspection improves. Of course, the effect of the first embodiment, too, can be obtained.

4. Third Embodiment

A third embodiment is different from the first embodiment in point of the configuration of the first pressure-sensitive layer. The first pressure-sensitive layer may be a layer of shape memory alloy.

Figure 11:
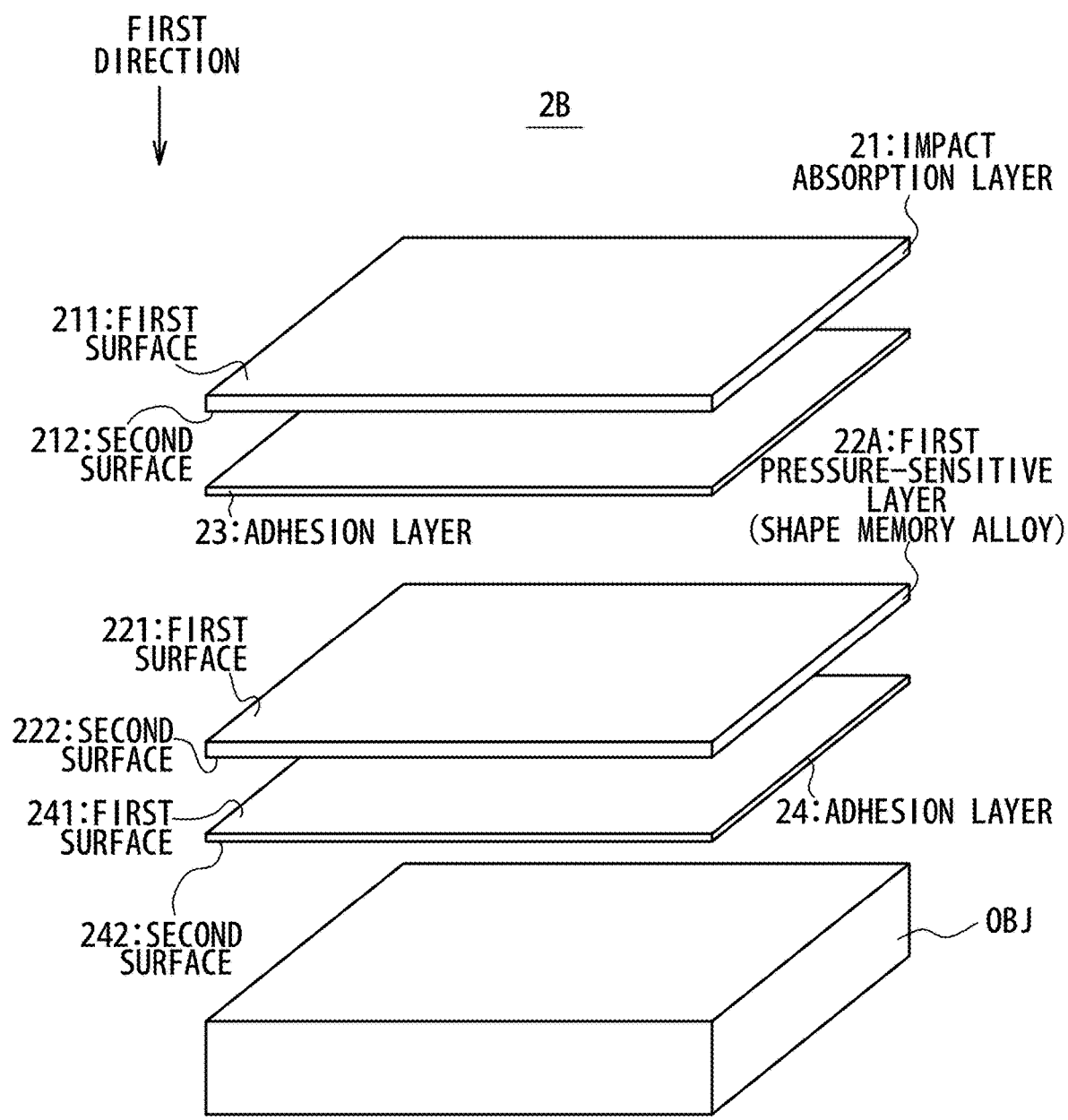
FIG. 11 is an exploded perspective view showing an example of configuration of an impact sensing laminate 2B.

FIG. 11 is an exploded perspective view showing an example of configuration of the impact sensing laminate 2B. In the example shown in FIG. 11, the impact sensing laminate 2B has the impact absorption layer 21, the first pressure-sensitive layer 22A, a surface on which the impact force acts (the first surface 211 of the impact absorption layer 21), a surface brought in contact with the protection object OBJ (the second surface of the adhesion layer 24). Additionally, the impact sensing laminate 2B has the adhesion layer 23 and the adhesion layer 24.

In the example shown in FIG. 11, the first pressure-sensitive layer 22A is a layer of shape memory alloy. The first pressure-sensitive layer 22A notifies that the impact force exceeding the first threshold value has acted on itself, by a physical change of the shape memory alloy. In the initial state, the layer of shape memory alloy is flat. When the magnitude of impact force to have been attenuated by the impact absorption layer 21 exceeds the first threshold value, the shape of the area on which the impact force has acted (the impact force acting area) changes (plastic deformation). For example, a part of the impact force acting area becomes hollow. Therefore, the worker specifies an area of the first pressure-sensitive layer 22A where the plastic deformation occurred.

When the shape memory alloy is used for the first pressure-sensitive layer, the first threshold value is equivalent to an elastic limit (a yield point). For example, the first pressure-sensitive layer 22A having the first threshold value is attained by selecting the material of shape memory alloy.

It may be difficult to provide cut lines or weakened lines for the first pressure-sensitive layer 22A because of the material of shape memory alloy or the thickness of shape memory alloy. In such a case, a plurality of small impact sensing laminates 2B (ex. 10 cm×10 cm) may be arranged on the protection object OBJ in a 2-dimensional manner. In this case, the periphery of each of the plurality of impact sensing laminates 2B is regarded as cut lines.

Regarding the impact sensing method and the protection object inspecting method, the third embodiment is similar to the first embodiment. However, the attention should be paid to the following points:

1) When a cut line or a weakened line is not provided for the first pressure-sensitive layer 22A, a partial area cannot be delaminated from the impact sensing laminates 2B. In this case, at the step ST22, the plurality of small impact sensing laminates 2B are arranged on the protection object OBJ as described above. At the steps of forming the delamination area (ST211 and ST214), the impact sensing laminate containing the impact force acting area is removed when the impact force acting area is found out from among the plurality of impact sensing laminates 2B; and 2) For example, when the shape memory alloy (the first pressure-sensitive layer 22A) delaminated at the step ST18 is reused, the shape memory alloy returns to the initial state by heating to the delaminated shape memory alloy above the threshold value temperature. The threshold value temperature is determined based on the characteristic of shape memory alloy (ex. 80° C.).

In the third embodiment, the same effect as in the first embodiment can be attained.

Figure 12:
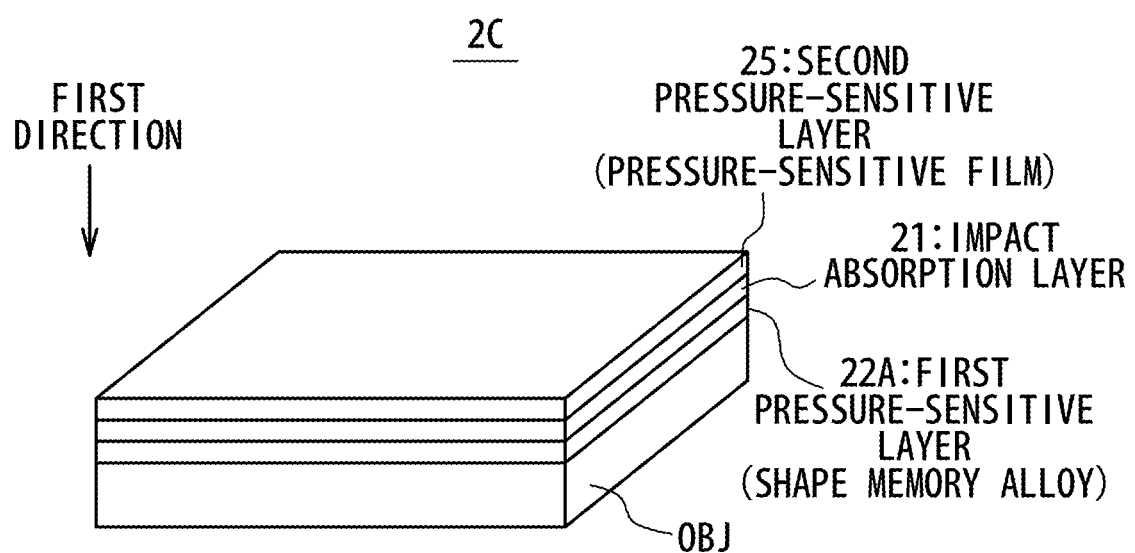
FIG. 12 is an exploded perspective view showing an example of configuration of an impact sensing laminate 2C.

The third embodiment may be combined with the second embodiment. In other words, regarding the material of the layer, the first pressure-sensitive layer may be different from the second pressure-sensitive layer. FIG. 12 is an exploded perspective view showing an example of configuration of an impact sensing laminate 2C. As shown in FIG. 12, the shape memory alloy may be used for the first pressure-sensitive layer 22A, and a pressure-sensitive film (ex. a pressure sensitive paper) may be applied to the second pressure-sensitive layer 25. Oppositely, the pressure-sensitive film may be applied to the first pressure-sensitive layer and the shape memory alloy may be applied to the second pressure-sensitive layer. Or, even if the shape memory alloy is applied to both of the first pressure-sensitive layer and the second pressure-sensitive layer, there is no problem. The effect of the second embodiment can be attained in addition to the effect of the first embodiment.

5. Fourth Embodiment

A fourth embodiment is different from the first embodiment in point of the configuration of first pressure-sensitive layer. The first pressure-sensitive layer may be a layer which contains a plurality of piezo-electric devices arranged in a 2-dimensional manner.

Figure 13:
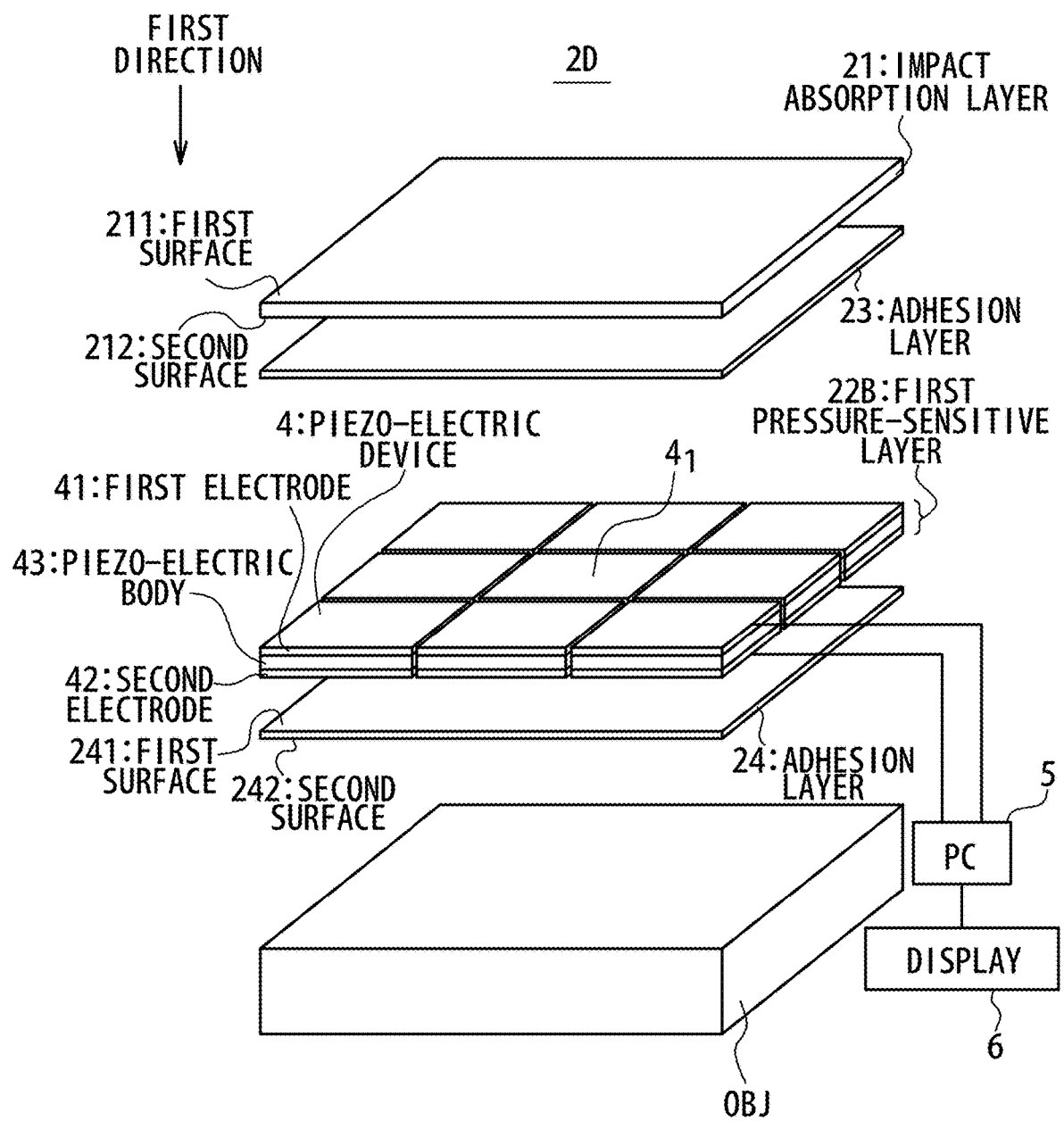
FIG. 13 is an exploded perspective view showing an example of configuration of an impact sensing laminate 2D.

FIG. 13 is an exploded perspective view showing an example of configuration of the impact sensing laminate 2D. In the example shown in FIG. 13, the impact sensing laminate 2D has the impact absorption layer 21, the first pressure-sensitive layer 22B, the surface on which the impact force acts (the first surface 211 of the impact absorption layer 21), and the surface brought in contact with the protection object OBJ (the second surface of the adhesion layer 24). Additionally, the impact sensing laminate 2D has the adhesion layer 23 and the adhesion layer 24. Actually, an insulator (not shown) is provided between the impact absorption layer 21 (the adhesion layer 23) and the first pressure-sensitive layer 22B. In the same way, an insulator (not shown) is provided between the first pressure-sensitive layer 22B (the adhesion layer 24) and the protection object OBJ. In the example shown in FIG. 13, a physical computer 5 is electrically connected with the impact sensing laminate 2D. The physical computer (PC) 5 is connected with a display 6. For example, the physical computer 5 has a memory and a hardware processor which executes software processing.

In the example shown in FIG. 13, the first pressure-sensitive layer 22B is a layer which contains the plurality of piezo-electric devices 4 arranged in the 2-dimensional manner. The first pressure-sensitive layer 22B is a layer to notify that the impact force exceeding the first threshold value acted on itself, by an electric change. For example, each of the plurality of piezo-electric devices 4 has a first electrode 41, a second electrode 42 and a piezo-electric body 43. The piezo-electric body 43 is put between the first electrode 41 and the second electrode 42. The piezo-electric body 43 generates a voltage between the first electrode 41 and the second electrode 42 according to the magnitude of impact force acting on itself. When the impact force exceeding the first threshold value does not act on the first pressure-sensitive layer 22B, the voltage does not change.

For example, it is supposed that the impact force to have been attenuated by the impact absorption layer 21 acted on a first piezo-electric device $4_1$. The first piezo-electric device $4_1$ is one of the plurality of piezo-electric devices 4. When the impact force acts on the first piezo-electric device 4, the voltage is generated between the first electrode 41 and the second electrode 42 in first piezo-electric device $4_1$ according to the magnitude of impact force. The generated voltage is supplied to the physical computer 5 as an electric signal. The electric signal is processed by the physical computer 5 and is displayed on the display 6. When the impact force to have been attenuated by the impact absorption layer 21 acts on the first piezo-electric device 4, the electric signal changes from a low level to a high level (in a voltage level). The electric signal (of a voltage level) of each of the other piezo-electric devices does not change. Therefore, by monitoring the change of the electric signal of each piezo-electric device 4, the worker can know that the impact force acted on the first piezo-electric device $4_1$. In addition, by monitoring the change of the electric signal of each piezo-electric device 4 continuously, the worker can know when the impact force acted on the first pressure-sensitive layer 22B. The physical computer 5 may notify the change of the electric signal in sound in place of the display 6.

When the plurality of piezo-electric devices are used for the first pressure-sensitive layer, for example, the first threshold value is equivalent to a voltage level. In the example shown in FIG. 13, the physical computer 5 determines whether or not the impact force to have been attenuated by the impact absorption layer 21 exceeded the first threshold value based on the electric signal to have received from the first pressure-sensitive layer 22B. This determination is executed in software by the hardware processor of the physical computer 5. Therefore, the first threshold value is given to a software program which runs on the physical computer 5.

When the plurality of piezo-electric devices are used for the first pressure-sensitive layer, the attention should be paid to the following points:

1) It may be difficult to set the first threshold value to the first pressure-sensitive layer 22B itself due to the structural problem of the piezo-electric device. In other words, it may be difficult for each of the plurality of piezo-electric devices to sense whether or not the impact force to have been attenuated by the impact absorption layer 21 exceeds the first threshold value. In such a case, the physical computer 5 can determine whether the voltage level is above the first threshold value.

2) It may be technically difficult to provide cut lines or weakened lines for the first pressure-sensitive layer 22B because of the structural problem. In such a case, the plurality of small impact sensing laminates 2D may be arranged on the protection object OBJ 2-dimensionally, as described in the third embodiment. In this case, the periphery of each of the plurality of impact sensing laminates 2D is regarded as the cut lines.

3) When any cut lines or weakened lines are not provided for the first pressure-sensitive layer 22D, the impact sensing laminate is removed in which the impact force acting area has been found out from among the plurality of impact sensing laminates 2D, at the steps (ST211 and ST214) of forming the delamination area, as described in the third embodiment.

In the fourth embodiment, the same effect as in the first embodiment can be obtained. The fourth embodiment and the second embodiment may be combined. In other words, the plurality of piezo-electric devices may be used for the first pressure-sensitive layer, and the pressure-sensitive film (the pressure sensitive paper) may be used for the second pressure-sensitive layer. Oppositely, the pressure-sensitive film may be used for the first pressure-sensitive layer and the plurality of piezo-electric devices may be used for the second pressure-sensitive layer. As mentioned above, regarding the material (the structure) of the layer, the first pressure-sensitive layer may be different from the second pressure-sensitive layer. Or, the plurality of piezo-electric devices may be used for both of the first pressure-sensitive layer and the second pressure-sensitive layer. The effect of the second embodiment is obtained in addition to the effect of the first embodiment.

6. Fifth Embodiment

In a fifth embodiment, the second pressure-sensitive layer 25 and the impact absorption layer 21 which are shown in FIG. 8 are unified. Therefore, the impact absorption layer includes a color former.

Figure 14:
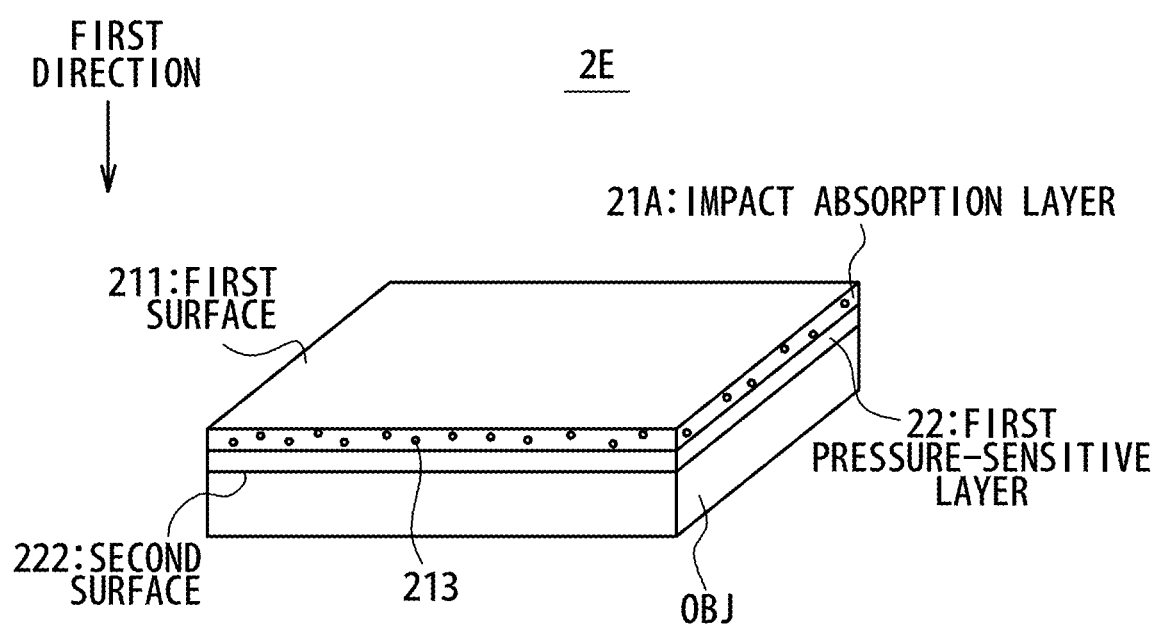
FIG. 14 is an exploded perspective view showing an example of configuration of an impact sensing laminate 2E.

FIG. 14 is an exploded perspective view showing an example of configuration of the impact sensing laminate 2E. In an example shown in FIG. 14, the impact sensing laminate 2E has the impact absorption layer 21A, the first pressure-sensitive layer 22, the surface on which the impact force acts (the first surface 211 of the impact absorption layer 21A), and the surface brought in contact with the protection object OBJ (the second surface 222 of the first pressure-sensitive layer 22).

The impact absorption layer 21A has the role of the impact absorption layer 21 shown in FIG. 8 and the role of the second pressure-sensitive layer 25 shown in FIG. 8. In other words, the impact absorption layer 21A is a layer to sense that the impact force has acted and to attenuate the impact force. In the example shown in FIG. 14, the impact absorption layer 21A includes a plurality of microcapsules 213 and a developer (not shown). For example, the impact absorption layer 21A is configured from two films (not shown). The plurality of microcapsules 213 and the developer are provided between the two films. For example, each of the two films is a transparent polyurethane film. The impact absorption layer 21A generates a color according to the impact force that acts on the impact absorption layer. Note that the impact absorption layer 21E may be divided into a plurality of areas, and may have the cut lines or the weakened lines to surround the periphery of each of the plurality of areas.

In the fifth embodiment, the same effect as in the first embodiment and the same effect as in the second embodiment can be obtained.

In the above-mentioned description, an example was given in which the impact sensing laminate is provided for the main wing. However, the present invention is not limited to the above embodiments. The above embodiments are effective when the protection object is large (ex. the aircraft, the car, and the ship).

In the above, all the embodiments have been described. Various changes and modifications are applicable to the present invention in the range that does not deviate from the technical thought of the present invention. Unless any technical contradiction occurs, all the embodiments may be combined suitably. For example, the plurality of piezo-electric devices are applied to the first pressure-sensitive layer and the shape memory alloy may be applied to the second pressure-sensitive layer.

This application is based on Japanese Patent Application No. JP 2016-095934 filed on May 12, 2016 and claims a priority based on the Patent Application. The disclosure of the Patent Application is incorporated herein by reference.

The invention claimed is:

1. An impact sensing laminate comprising:
   a first surface on which an impact force acts;
   a second surface brought in contact with a protection object;
   an impact absorption layer; and
   a first pressure-sensitive layer,
   a second pressure-sensitive layer; and
   an impact absorption layer arranged between the first pressure-sensitive layer and the second pressure-sensitive layer,
   wherein, when a direction heading for the second surface from the first surface is defined as a first direction, the first pressure-sensitive layer is provided in the first direction from the impact absorption layer,
   wherein the second pressure-sensitive layer is a layer of sensing a second impact force as an impact force before attenuated by the impact absorption layer to specify a second impact force acting area as an area on which the second impact force acted,
   wherein the second pressure-sensitive layer is configured to delaminate the second impact force acting area from the impact sensing laminate to form a first delamination area,
   wherein the first pressure-sensitive layer is a layer of sensing a first impact force as an impact force to have been attenuated by the impact absorption layer to specify a first impact force acting area as an area which the first impact force acted, from the first delamination area, and
   wherein at least one of the first pressure-sensitive layer or the impact absorption layer is divided into a plurality of blocks, and has weakened lines surrounding each of the plurality of blocks to enable the at least one of the first pressure-sensitive layer or the impact absorption layer to be delaminated from a corresponding one of the plurality of blocks.

2. The impact sensing laminate according to claim 1, wherein the first pressure-sensitive layer is a layer of sensing whether or not a magnitude of the first impact force per unit area exceeds a first threshold value,
wherein the second pressure-sensitive layer is a layer of sensing whether or not a magnitude of the second impact force per unit area exceeds a second threshold value, and
wherein the first threshold value is different from the second threshold value.

3. The impact sensing laminate according to claim 1, wherein the first pressure-sensitive layer is different from the second pressure-sensitive layer in a thickness or a material.

4. The impact sensing laminate according to claim 1, wherein, when a permissible impact force per unit area is defined as a permissible impact force, the impact absorption layer attenuates an impact force of 1.5 of times of the permissible impact force to the permissible impact force or below, to transmit to the first pressure-sensitive layer.

5. The impact sensing laminate according to claim 1, wherein the first pressure-sensitive layer is any one of a layer that contains a color former, a layer that contains shape memory alloy, and a layer that contains a plurality of piezo-electric devices arranged 2-dimensionally.

6. The impact sensing laminate according to claim 1, wherein the impact absorption layer is a layer that can be delaminated from the first pressure-sensitive layer.

7. The impact sensing laminate according to claim 1, wherein the second surface is a surface of an adhesion layer which is detachable to the protection object.

8. The impact sensing laminate according to claim 1, wherein the impact absorption layer generates a color based on the impact force that acts on the impact absorption layer.

9. An impact sensing method comprising:
preparing an impact sensing laminate that contains a first pressure-sensitive layer, a second pressure-sensitive layer and an impact absorption layer arranged between the first pressure-sensitive layer and the second pressure-sensitive layer, wherein at least one of the first pressure-sensitive layer or the impact absorption layer is divided into a plurality of blocks, and has weakened lines surrounding each of the plurality of blocks to enable the at least one of the first pressure-sensitive layer or the impact absorption layer to be delaminated from a corresponding one of the plurality of blocks;
arranging the impact sensing laminate on a protection object; and
sensing the impact force which acts on the impact sensing laminate,
wherein the sensing the impact force comprises:
sensing by the first pressure-sensitive layer, the first impact force which is the impact force to have been attenuated by the impact absorption layer;
sensing a second impact force as an impact force before being attenuated by the impact absorption layer;
specifying a second impact force acting as an area on which the second impact force acted;
delaminating the second impact force acting area of the second pressure-sensitive layer from the impact sensing laminate to form a first delamination area; and
specifying a first impact force acting area as an area on which the first impact force acted, from the first delaminated area.

10. The impact sensing method according to claim 9, wherein the sensing the impact force further comprises delaminating the first impact force acting area of the first pressure-sensitive layer from the impact sensing laminate to form a second delamination area, wherein the impact sensing method further comprises reusing to sense the impact force that acts on the impact sensing laminate in which the first delamination area and the second delamination area are formed.

* * * * *